(12) United States Patent
Yamaura et al.

(10) Patent No.: US 10,534,550 B2
(45) Date of Patent: Jan. 14, 2020

(54) INFORMATION PROCESSING APPARATUS, INFORMATION PROCESSING METHOD, AND COMPUTER PROGRAM PRODUCT

(71) Applicant: Toshiba Memory Corporation, Tokyo (JP)

(72) Inventors: Takahiro Yamaura, Kawasaki (JP); Shingo Tanaka, Yokohama (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/914,273

(22) Filed: Mar. 7, 2018

(65) Prior Publication Data

US 2018/0196617 A1    Jul. 12, 2018

Related U.S. Application Data

(63) Continuation of application No. 14/824,416, filed on Aug. 12, 2015, now Pat. No. 9,946,477.

(30) Foreign Application Priority Data

Jan. 19, 2015    (JP) .................................. 2015-008069

(51) Int. Cl.
*G06F 3/06* (2006.01)
(52) U.S. Cl.
CPC .......... *G06F 3/0619* (2013.01); *G06F 3/0655* (2013.01); *G06F 3/0688* (2013.01)
(58) Field of Classification Search
CPC .... G06F 3/0619; G06F 3/0685; G06F 3/0688; G06F 3/068; G06F 3/0655; G06F 3/0632

USPC ......................................................... 711/103
See application file for complete search history.

(56) References Cited

U.S. PATENT DOCUMENTS 8,990,525 B2    3/2015 Yoshida et al.
2014/0095555 A1*    4/2014 Kim .................... G06F 16/1847
                                                                  707/823

FOREIGN PATENT DOCUMENTS

JP    2006-99406    4/2006

OTHER PUBLICATIONS

Sheng Qiu et al. "NVMFS: A Hybrid File System for Improving Random Write in NAND-Flash SSD", 2013 IEEE 29$^{th}$ Symposium on Mass Storage Systems and Technologies (MSST), May 2013, 5 pages.
Xiaojian Wu et al. "SCMFS: A File System for Storage Class Memory", in Proceedings of 2011 International Conference for High Performance Computing, Networking, Storage and Analysis, ser. SC'11, 2011, 11 pages.
Sheng Qiu et al. "Exploiting Superpages in a Nonvolatile Memory File System", IEEE Mass Storage Symposium, Apr. 2012, 5 pages.

* cited by examiner

*Primary Examiner* — Hua J Song
(74) *Attorney, Agent, or Firm* — Oblon, McClelland, Maier & Neustadt, L.L.P.

(57) ABSTRACT

According to an embodiment, an information processing apparatus includes a non-volatile memory manager. The non-volatile memory manager is configured to save, in a non-volatile memory section, information of a plurality of storage sections to be read after rebooting. The non-volatile memory section is configured to keep storing information even if power is off.

8 Claims, 24 Drawing Sheets

FIG.24

| BLOCK SET NUMBER | BIT MAP | | | |
|---|---|---|---|---|
| | 127TH BIT | ... | 1ST BIT | 0TH BIT |
| 0 | 1 | ... | 1 | 1 |
| 1 | 1 | ... | 1 | 1 |
| 2 | 1 | ... | 1 | 1→0 |
| 3 | 1 | ... | 1 | 1 |
| 4 | 1 | ... | 1 | 1 |
| 5 | 0→1 | ... | 0→1 | 0→1 |
| ⋮ | ⋮ | ... | ⋮ | ⋮ |
| ⋮ | ⋮ | ... | ⋮ | ⋮ |
| ⋮ | ⋮ | ... | ⋮ | ⋮ |
| (n/128)-1 | 0 | ... | 0 | 0 |

STATUS BIT MAP

FIG.25

LBA MAPPING TABLE

| LBA OF BLOCK DEVICE | LBA OF STORAGE SECTION | |
|---|---|---|
| 0 | 431 | |
| 1 | 998 | |
| 2 | 683 | |
| 3 | 112 | |
| 4 | 257 | →768 |
| ⋮ | ⋮ | |
| ⋮ | ⋮ | |
| ⋮ | ⋮ | |
| n | 752 | |

INFORMATION PROCESSING APPARATUS, INFORMATION PROCESSING METHOD, AND COMPUTER PROGRAM PRODUCT

CROSS-REFERENCE TO RELATED APPLICATION

This application is a continuation application of, and claims the benefit of priority under 35 U.S.C. § 120 from, U.S. application Ser. No. 14/824,416, filed Aug. 12, 2015, which claims the benefit of priority under 35 U.S.C. § 119 from Japanese Patent Application No. 2015-008069, filed on Jan. 19, 2015. The entire contents of each of the above applications are incorporated herein by reference.

FIELD

Embodiments described herein relate generally to an information processing apparatus, an information processing method, and a computer program product.

BACKGROUND

Recently, a byte accessible non-volatile memory, such as spin transfer torque random access memory (STT-RAM), has attracted attention. Such a non-volatile memory can be connected to a memory bus of a processor for use. Further, a plurality of storage devices can be connected to an information processing apparatus.

Even if a failure, such as sudden power-off, occurs, the information processing apparatus including the processor to which the byte accessible non-volatile memory is connected can hold data stored in the non-volatile memory until immediately before the failure. However, in such an information processing apparatus, usage of the non-volatile memory is fixedly determined beforehand, and information of a plurality of storage sections is not allowed to be held.

BRIEF DESCRIPTION OF THE DRAWINGS

FIG. 10 is a diagram illustrating information stored in the non-volatile memory section, the storage section, and the like;

FIG. 24 is a diagram illustrating a status bit map;

FIG. 25 is a diagram illustrating an LBA mapping table;

DETAILED DESCRIPTION

According to an embodiment, an information processing apparatus includes a non-volatile memory manager. The non-volatile memory manager is configured to save, in a non-volatile memory section, information of a plurality of storage sections to be read after rebooting. The non-volatile memory section is configured to keep storing information even if power is off.

An information processing apparatus according to embodiments will be described below in detail with reference to the drawings. The information processing apparatus according to the present embodiment is intended to use a cache of management information and data information of a virtual file system after rebooting.

First Embodiment

Figure 1:
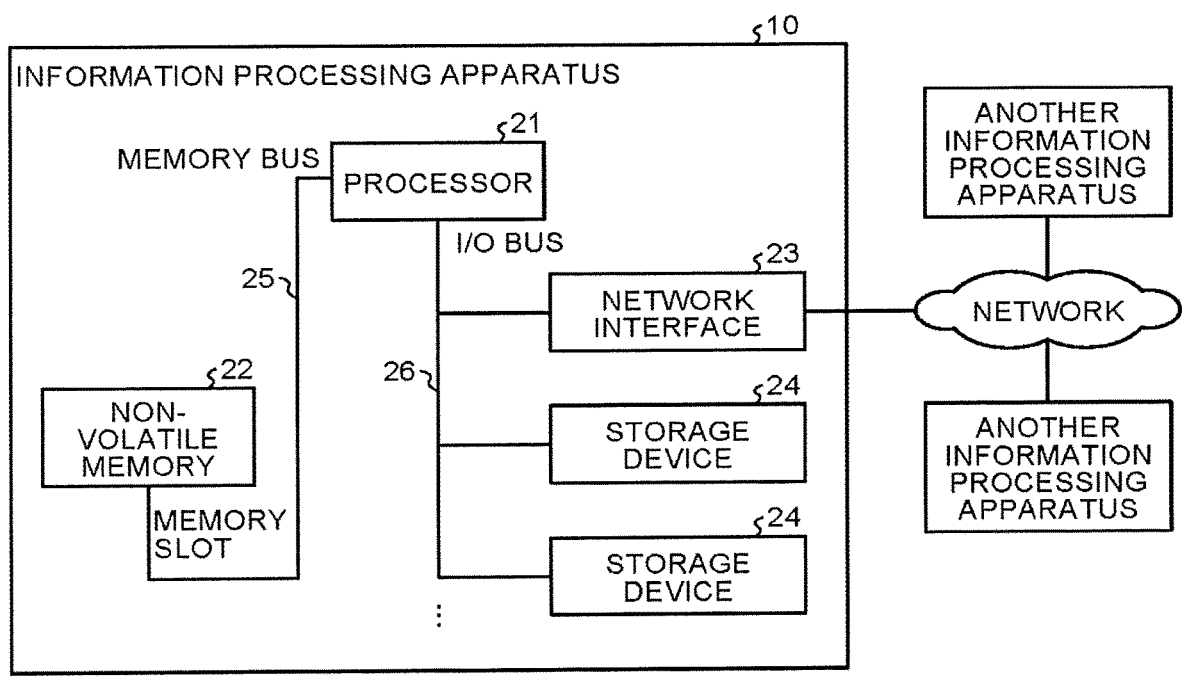
FIG. 1 is a hardware configuration diagram of an information processing apparatus according to a first embodiment.

FIG. 1 is a hardware configuration diagram of the information processing apparatus 10 according to a first embodiment. The information processing apparatus 10 includes a processor 21, a non-volatile memory 22, a network interface 23, and at least one storage device 24.

The processor 21 is an arithmetic controller such as a central processing unit (CPU). The processor 21 executes a program. The processor 21 executes the program to perform arithmetic processing, control processing, or the like, using a non-volatile memory 22 as a main memory device.

The processor 21 includes a memory management unit (MMU). The MMU has an address translation function, a memory protection function, and cache control function. The address translation function is a function to translate a virtual address to a physical address. The memory protection function is a function to prohibit access to a specific address, and raise an exception upon generation of access to the address to which the access is prohibited. The cache control function is a function for causing the main memory device to cache data read from the CPU cache and data written to the CPU cache.

The non-volatile memory 22 is a memory device configured to keep storing information even if power is off. The non-volatile memory 22 is accessed in bytes from the processor 21, and functions as the main memory device of the processor 21. The non-volatile memory 22 is mounted, for example, to a memory slot such as a dual inline memory module (DIMM) slot, and connected to the MMU of the processor 21 through a memory bus 25.

The non-volatile memory 22 is, for example, spin transfer torque random access memory (STT-RAM), a phase-change memory (PCM), resistive memory (ReRAM), a battery backup DIMM, or the like. The battery backup DIMM includes dynamic random access memory (DRAM), a super-capacitor, and NAND flash memory. The battery backup DIMM writes the contents stored in the DRAM to the NAND flash memory, using power stored in the supercapacitor, upon occurrence of failure such as power off, a freeze, or the like, and writes the contents of the NAND flash memory back to the DRAM upon power restoration. Therefore, after rebooting, the battery backup DIMM can recover data stored in the DRAM until immediately before occurrence of failure. The non-volatile memory 22 is not limited to such a device, and may employ any device configured to be accessed from the processor 21 through the memory bus 25, and recover, after rebooting, data stored until immediately before occurrence of failure.

The network interface 23 communicates, through a network, with another information processing apparatus according to control from the processor 21. The network interface 23 is connected to the processor 21 through an I/O bus 26 such as a PCI Express. The network interface 23 communicates with the another information processing apparatus using a protocol such as Ethernet.

Each storage device 24 is a memory device configured to keep storing information even if power is off. The storage device 24 is, for example, a device having a capacity larger than that of the non-volatile memory 22, and is a low speed device. The storage device 24 is a solid state drive (SSD), a hard disk drive (HDD), or the like including the NAND flash memory. The storage device 24 may be one virtual device including a plurality of devices using a redundant arrays of inexpensive disks/redundant arrays of independent disks (RAID) controller or the like.

Each storage device 24 is connected to the processor 21 through the I/O bus 26 such as a PCI Express. The storage device 24 is accessed from the processor 21, using for example a protocol such as an NVM Express. The storage device 24 is accessed from the processor 21, for example, in data units called sectors (e.g., 512 bytes) larger than bytes.

Figure 2:
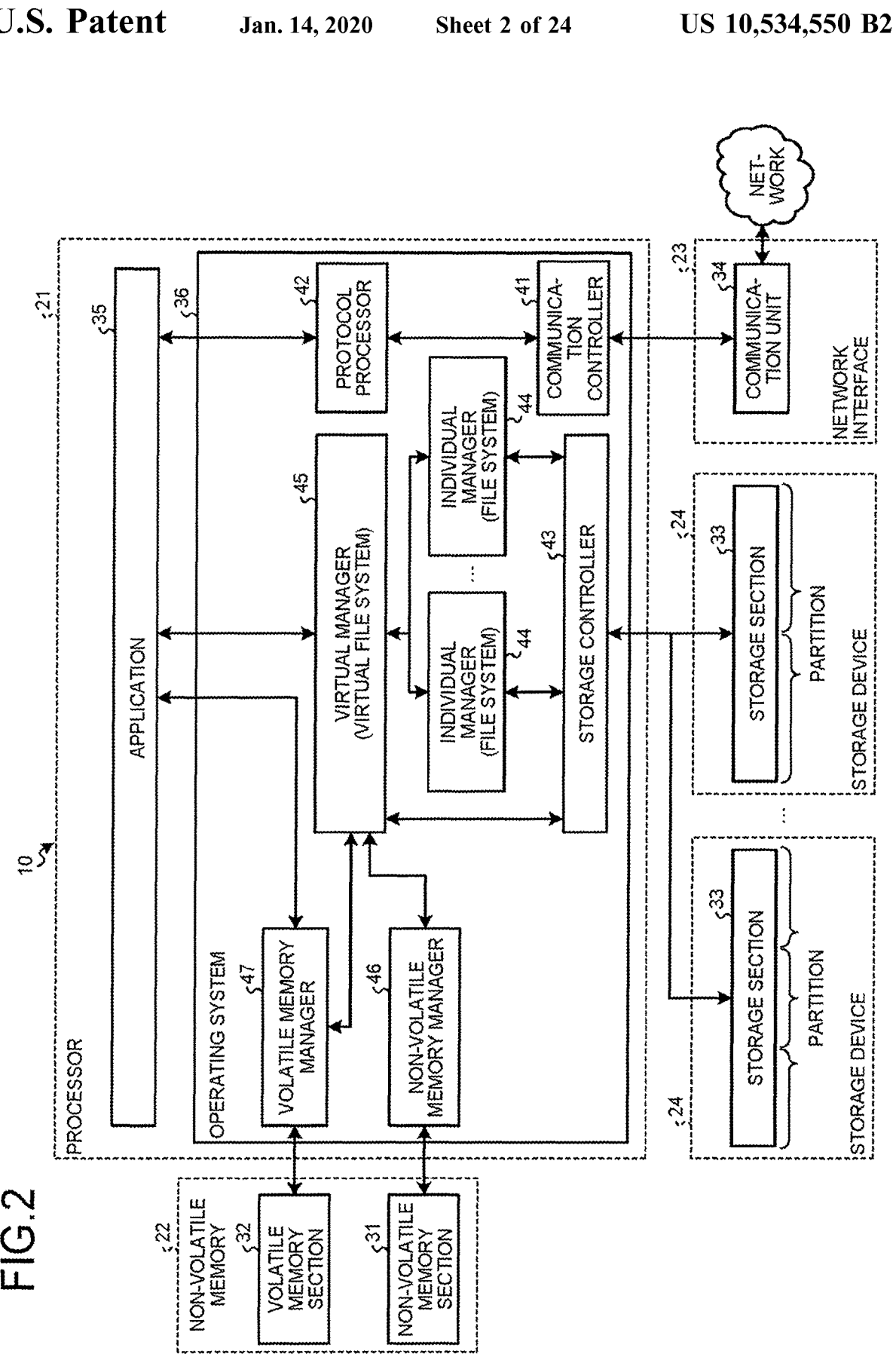
FIG. 2 is a functional block diagram of the information processing apparatus according to the first embodiment.

FIG. 2 is a diagram illustrating a configuration of a functional block of the information processing apparatus 10 according to the first embodiment. The information processing apparatus 10 includes a non-volatile memory section 31, a volatile memory section 32, at least one storage section 33, a communication unit 34, an application 35, and an operating system 36.

The non-volatile memory section 31 is included in the non-volatile memory 22. The non-volatile memory section 31 is a memory area configured to keep storing information even if power is off. The volatile memory section 32 is included in the non-volatile memory 22. The volatile memory section 32 is a memory area where information is not restored after power is off. The non-volatile memory section 31 and the volatile memory section 32 function as a main storage area of the processor 21. Addresses of the non-volatile memory 22 may be applied to divide the area between the non-volatile memory section 31 and the volatile memory section 32, or the areas of the non-volatile memory section 31 and the volatile memory section 32 may be set by the control of the processor 21 to be changeable according to conditions.

Each storage section 33 is included in any of the storage devices 24. The storage section 33 is a storage area configured to keep storing information even if power is off, that is, an area of an auxiliary memory device.

In each storage section 33, stored data is managed by a file system. The data stored in the storage section 33 is managed in units called files by the file system. In each storage section 33, for example, the file system is set by a user upon format, and management information or the like is written according to the set file system.

It is noted that, when the storage device 24 is divided into a plurality of partitions, each of the partitions functions as one storage section 33. Further, when the storage device 24 is not divided into partitions, the whole storage area functions as one storage section 33. When the storage device 24 is divided into partitions, information called a partition table is written into the storage device 24. The partition table stores the head positions, terminal end positions, types, or the like of the partitions.

The communication unit 34 is connected to the network interface 23. The communication unit 34 communicates with the another information processing apparatus through the network.

The application 35 is a functional block having an application program executed by the processor 21. In the present embodiment, the application 35 causes the present apparatus to function as a database. That is, the application 35 reads and returns, from the storage section 33, data requested from the another information processing apparatus or another application, and writes, to the storage section 33, data transmitted from the another information processing apparatus or the another application. It should be understood that the database is one example, and the application 35 may be any application.

The operating system 36 is a functional block having an operating system program executed by the processor 21. The operating system 36 basically functions to control and manage the present apparatus. The operating system 36 provides, for example, a user interface for the user. Further the operating system 36 provides, for example, an interface for access to the hardware, for the application 35.

The operating system 36 includes a communication controller 41, a protocol processor 42, a storage controller 43, at least one individual manager 44, a virtual manager 45, a non-volatile memory manager 46, and a volatile memory manager 47.

The communication controller 41 controls the communication unit 34. The protocol processor 42 performs processing according to a protocol for transmitting/receiving data through the communication controller 41. The protocol processor 42 performs processing, for example, according to a protocol of TCP/IP.

The storage controller 43 controls each storage section 33. The storage controller 43 is achieved by incorporating, into the operating system 36, a device driver being a software program for controlling the storage device 24.

The storage controller 43 performs specific processing according to kinds of a controller and a bus mounted to the storage device 24. The storage controller 43 receives a request for reading or writing data from the individual manager 44, the virtual manager 45, or the like. The storage controller 43 accesses the storage device 24 according to the received request.

The storage device 24 has a register interface and an interrupt interface to access the main memory device of the processor 21 (the non-volatile memory 22 in the present embodiment). The storage controller 43 allocates a descriptor area in the volatile memory section 32 upon initialization, and reports an address and a length of the descriptor area to the storage device 24 through the register interface. When receiving the request for reading or writing data, the storage controller 43 adds, in a descriptor, a kind of reading or writing, a position of data on the storage section 33, and a position of data on the non-volatile memory 22 being the main memory device, and gives a transfer instruction to the storage device 24. When receiving the transfer instruction from the storage controller 43, the storage device 24 accesses the descriptor to read the contents of the descriptor, and transfers data through direct memory access (DMA) according to the contents, from the storage section 33 to the main memory device, or from the main memory device to the storage section 33. When the DMA transfer is finished, the storage device 24 generates an interrupt to report the finish of the processing to the storage controller 43.

The storage device 24 reads or writes data for example in 512 bytes called sectors. Therefore, when rewriting data stored in the storage section 33 in bytes, the storage controller 43 reads 512 bytes of data from the storage section 33 to the main memory device, rewrites data in bytes on the main memory device, and writes the 512 bytes of data having been rewritten back to the storage section 33.

Each individual manager 44 manages the data stored in a corresponding storage section 33 in files based on a corresponding file system. Management of files stored in the storage section 33 differs according to the file systems applied to the storage sections 33.

Each individual manager 44 manages the data of the corresponding storage section 33 by the file system, for example, FAT, NTFS, ext2, ext3, ext4, XFS, JFS, RAMFS, NFS, a proc pseudo file system, or the like. The individual manager 44 may manage the data based on a file system other than the above file systems.

The file system manages data in units called blocks, for example, 4 KB blocks, or manages the data using a set of a start position and a length, the set called an extent.

Further, the file system manages overall management information (super block information in the present embodiment), file management information (inode information in the present embodiment), data information, and the like. The overall management information (super block information) is information for overall management of the file system. The file management information (inode information) is information provided for each file of the file system to manage corresponding files. The data information is information including real data of a file.

The virtual manager 45 manages a plurality of files belonging to different file systems using a common virtual file system. The virtual file system is a framework for handling a plurality of file systems in common. That is, the virtual manager 45 manages data stored on a plurality of storage sections 33 in files in common. Therefore, the virtual manager 45 provides an abstract interface for handling the plurality of file systems to the application 35. Accordingly, the application 35 can access each file in the same manner without recognizing what file system is used.

For example, the virtual manager 45 provides an application programming interface (API) for file operation to the application 35. The virtual manager 45 provides, for example, an open system call, a read system call, a write system call, an lseek system call, an fsync system call, a mmap system call, a munmap system call, an msync system call, and a close system call.

The open system call is a system call for obtaining a file descriptor for opening a file to operate the file. The read system call is a system call for reading specified data. The write system call is a system call for writing specified data. The lseek system call is a system call for moving a file position. The fsync system call is a system call for giving instruction of synchronization of a file cache. The mmap system call is a system call for mapping the data information of a file to a main memory device. The munmap system call is a system call for releasing the mapping by the mmap system call. The msync system call is a system call for giving an instruction of synchronization of a file cache of an area mapped by the mmap system call. The close system call is a system call for deallocating the file descriptor obtained by the open system call.

Further, the virtual manager 45 gives an instruction to each individual manager 44 according to access through the API. The virtual manager 45 gives, to each individual manager 44, an instruction for, for example, allocation and deallocation of the inode information, reading/writing of the inode information from/to the storage section 33, and writing of the super block information to the storage section 33. The virtual manager 45 also transmits and receives an interface to and from each individual manager 44, using a unified abstract interface.

Further, the virtual manager 45 caches management information and data information of the virtual file system in the non-volatile memory section 31 as the main storage area. Specifcally, caching any data in the non-volatile memory section 31 is defined as storing the data stored in the storage section 33 and then allowing the non-volatile memory section 31 for the following access to the same data. Therefore, the virtual manager 45 does not need to access the storage section 33 each time, and can speed up access to the data. More specifically, the virtual manager 45 causes the non-volatile memory section 31 to cache the super block information (overall management information) and the inode information (file management information), as the management information of the virtual file system.

Further, the virtual manager 45 divides the management information of the virtual file system into abstract management information, and management information specific to a file system, and manages each management information. Specifically, the virtual manager 45 manages the super block information common to the file systems and the inode information common to the file systems which are expressed in a common formant, and the super block information specific to a file system and the inode information specific to a file system which are expressed in a format specific to the file system.

Further, the virtual manager 45 caches page size of data information of a file, the page size being a normal manager for data of the main storage area. This unit is often referred to as a page cache. The page size differs according to architectures, but generally the page size is 4 KB.

The non-volatile memory manager 46 and the volatile memory manager 47 manage storage areas of the non-volatile memory 22. Specifically, the non-volatile memory manager 46 allocates a use area to the non-volatile memory section 31, or deallocates the use area, responding to a request from the virtual manager 45, the application 35, or the like. Further, the volatile memory manager 47 allocates a use area to the volatile memory section 32, or deallocates the use area, responding to a request from the virtual manager 45, the application 35, or the like. It is noted that addresses may be assigned to divide the use area between the non-volatile memory manager 46 and the volatile memory manager 47 so that, for example, the non-volatile memory section 31 uses a front half area of the non-volatile memory 22, and the volatile memory section 32 uses a rear half area, or the use area may be divided in association with each other.

Here, the non-volatile memory manager 46 causes the non-volatile memory section 31 to cache the management information (the super block information and the inode information) and the data information of the virtual file system to be read after rebooting. More specifically, the non-volatile memory manager 46 causes the non-volatile memory section 31 to cache the management information of the virtual file system and the data information of a file to be traced from data stored at a predetermined address.

Therefore, when the information processing apparatus 10 is rebooted due to occurrence of failure or the like, the non-volatile memory manager 46 can read data from the predetermined address of the non-volatile memory section 31 to efficiently recover cache data of the plurality of files managed by the different file systems.

Figure 3:
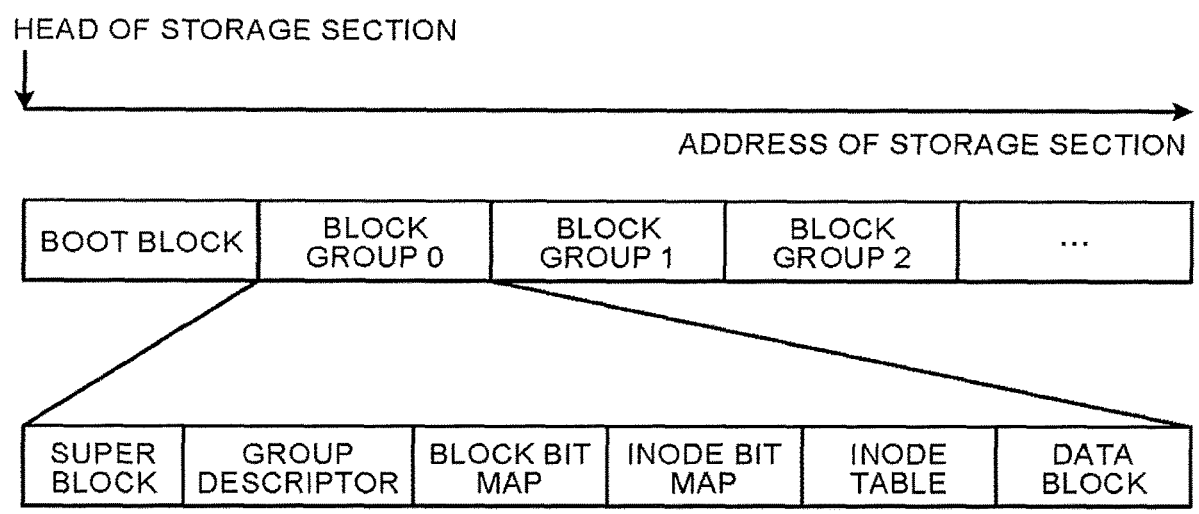
FIG. 3 is a diagram illustrating data stored in a storage section.

FIG. 3 is a diagram illustrating an example of placement of data stored in the storage section 33. In an example illustrated in FIG. 3, the storage section 33 is managed by the file system for managing data in blocks.

A boot block is placed at the head of the storage section 33. In the storage section 33, a plurality of block groups are sequentially placed following the boot block. The boot block is also called boot sector. A program for booting the operating system 36 is stored in the boot block.

Each of the group blocks includes a super block, a group descriptor, a block bit map, an inode bit map, an inode table, and a data block. The super block information is stored in the super block. The super block information includes information such as the number of inodes of the whole file system, a size of a block of the file system specified upon format, a size of the whole file system, the number of unused blocks, the number of unused inodes, and the number of blocks and the number of inodes per block group. It is noted that the super block information is included in all group blocks. However, normally, only the super block information of the block group at the head is used.

Information about a block group is stored in the group descriptor. Specifically, the group descriptor stores the block bit map in the block group, the inode bit map, the inode table, a block number of the data block counted from the head of the file system, the number of unused inodes, the number of unused data blocks, and the like.

The block bit map stores information for management of used or unused data blocks. The inode bit map stores information for management of used or unused inode tables.

The inode table stores an array including the inode information of each file. The inode information is information for management of corresponding files. The inode information includes, for example, the size of the file, the user ID of the file's owner, last modification time and last access time, and arrangement of data block numbers. The data block stores the data information of a file. The data blocks are referenced from arrangement of data block numbers in the inode table. It is noted that when the storage section 33 is managed according to another file system, the data is stored in another arrangement.

Figure 4:
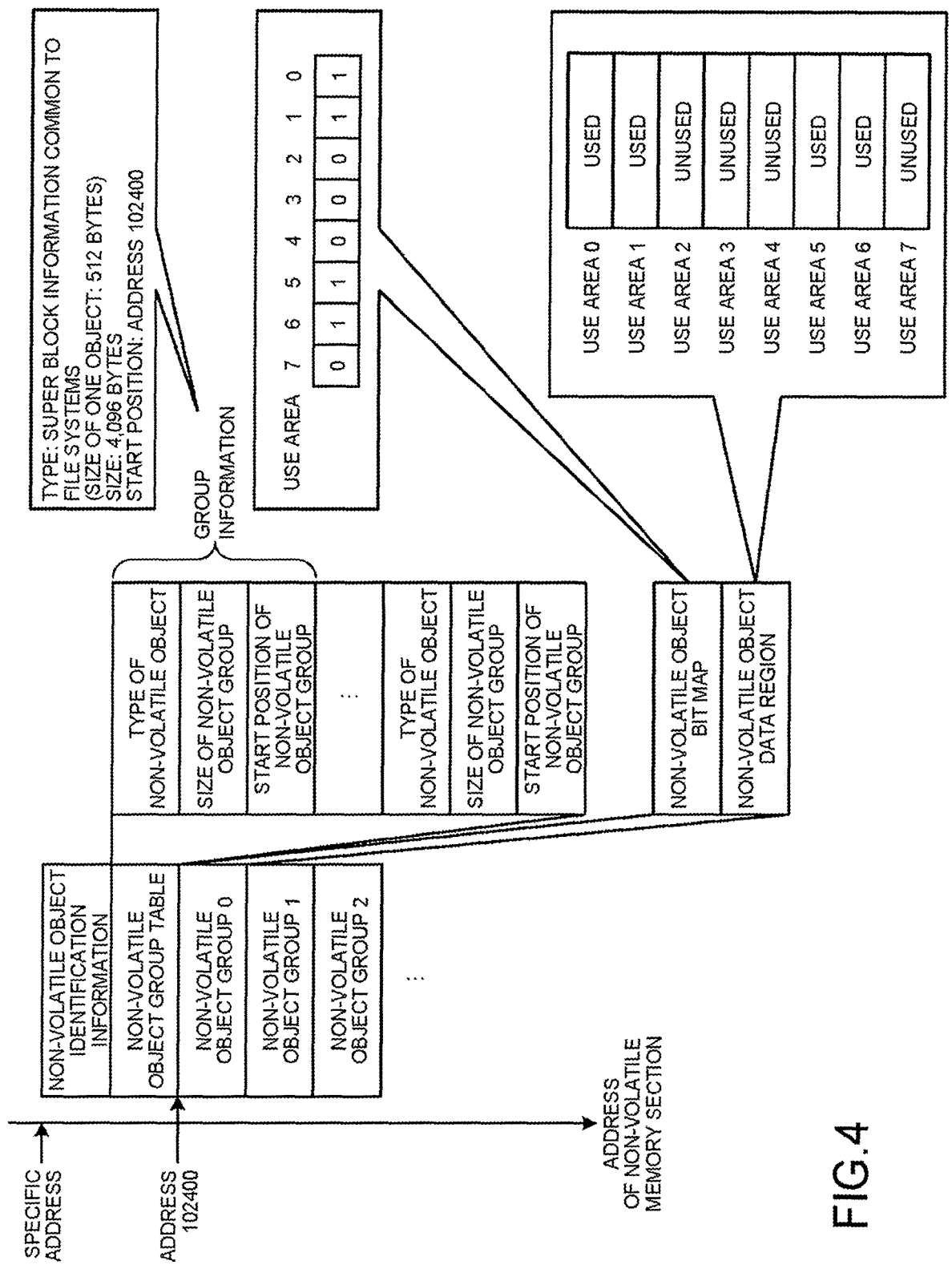
FIG. 4 is a diagram illustrating information stored in a non-volatile memory section.

FIG. 4 is a diagram illustrating placement of information stored in the non-volatile memory section 31. The non-volatile memory manager 46 manages the use area of the non-volatile memory section 31 so that the data stored in the non-volatile memory section 31 can be read after rebooting.

The non-volatile memory manager 46 writes non-volatile object identification information of a predetermined size from a predetermined address of the non-volatile memory section 31 (e.g., a specific address such as an initial address). The non-volatile object identification information is unique identification information of the present apparatus (information processing apparatus 10). The non-volatile object identification information may be a serial number information of the information processing apparatus 10 or a media access control (MAC) address of the network interface, or a value generated by applying a hash function or the like over a value of the serial number information or the MAC address. The non-volatile object identification information is written at the predetermined address of the non-volatile memory section 31, so that the non-volatile memory manager 46 can read the non-volatile object identification information without being externally addressed upon rebooting.

The non-volatile memory manager 46 writes a non-volatile object group table to an area following the non-volatile object identification information. Further, the non-volatile memory manager 46 writes a plurality of non-volatile object groups to an area following the non-volatile object group table. The non-volatile object group is an area storing the non-volatile object.

Here, the non-volatile object represents information stored in the non-volatile memory section 31. More specifically, the non-volatile object represents the super block information, the inode information, the data information of a file, and the like.

The non-volatile objects are grouped and stored in the non-volatile memory section 31 according to a type. One non-volatile object group stores a predetermined number of non-volatile objects of the same type. It is noted that, after the predetermined number of non-volatile objects are stored in one non-volatile object group, subsequent non-volatile objects of the same type are stored in another new non-volatile object group.

The non-volatile object group table stores group information corresponding to each non-volatile object group. The group information includes information about the corresponding non-volatile object group. More specifically, the group information includes a type of the non-volatile object included in the non-volatile object group, a size of the non-volatile object group, and a start position of the non-volatile object group.

The type of the non-volatile object stores information for identification of the super block information common to the file systems or the like. The non-volatile object group has a size storing information of for example 4,096 bytes. The start position of the non-volatile object group stores, for example, information, e.g., address 102400.

It is noted that the group information may further include a size of the non-volatile object. However, the size of the non-volatile object is unambiguously defined based on the type of the non-volatile object. For example, super block information common to the file systems has a size of, for example, 512 bytes.

On condition that a sufficient number of non-volatile object groups are generated, the non-volatile memory manager 46 may previously allocate a recording region of the non-volatile object group table in the non-volatile memory section 31. Further, when the number of non-volatile object groups exceeds a number initially set, the non-volatile memory manager 46 may extend another area on the nonvolatile memory section 31 to have a linked list structure to make a storage area of the non-volatile object group table.

The non-volatile object group includes a non-volatile object bit map and a non-volatile object data region. A predetermined number of use areas (entries) are formed in the non-volatile object data region. The non-volatile object is stored in each of the use areas.

The non-volatile object bit map indicates whether each of the use areas of the non-volatile object data region is used or unused. For example, the non-volatile object bit map includes a plurality of bits corresponding to the use areas. For example, each bit indicates 1, when a corresponding use area is used for the non-volatile object (the non-volatile object is stored), and indicates 0, when the corresponding use area is not used for the non-volatile object (non-volatile object is not stored).

Figure 5:
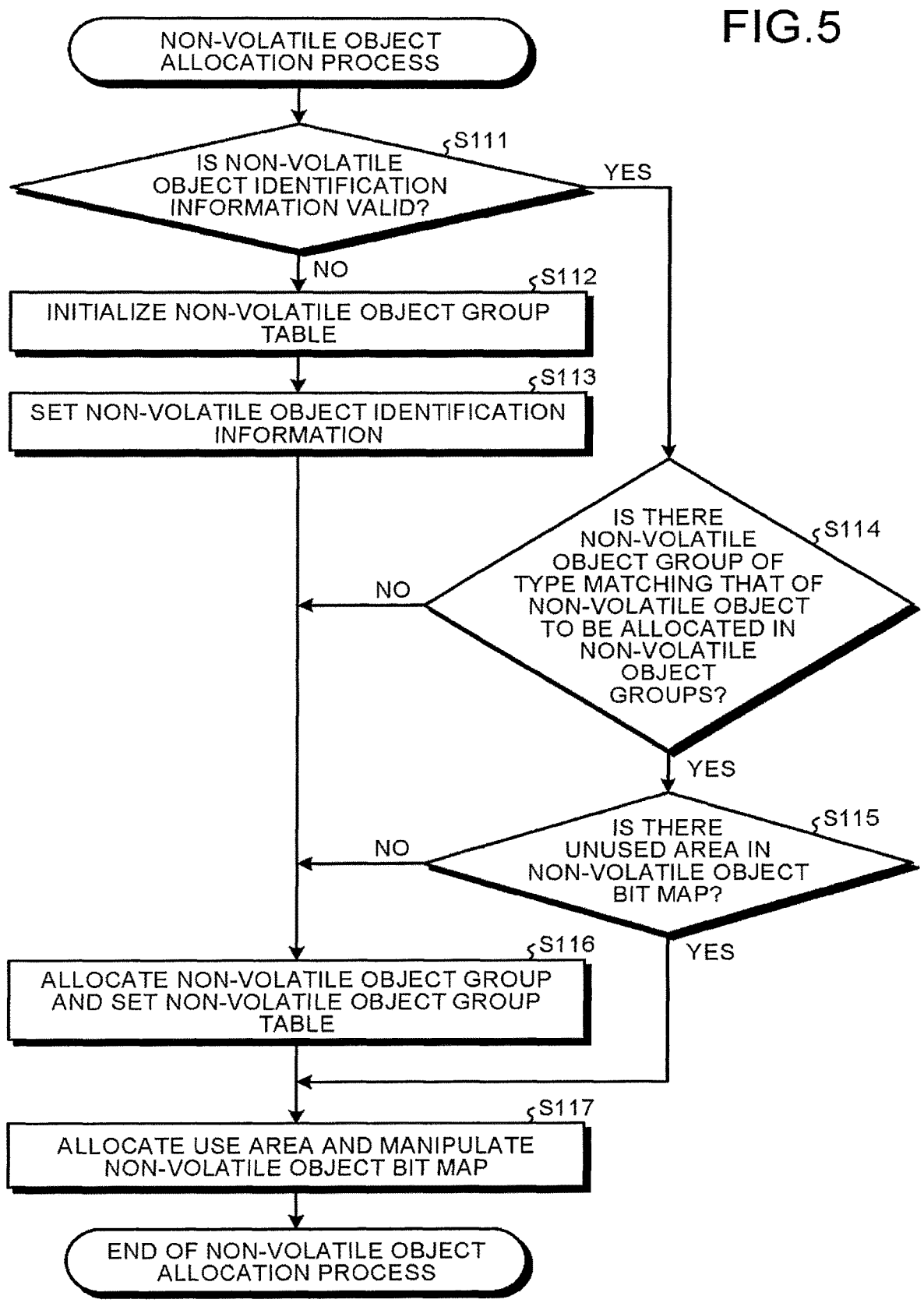
FIG. 5 is a flowchart illustrating an allocation process.

FIG. 5 is a flowchart illustrating an allocation process. When the non-volatile object is stored in the non-volatile memory section 31, the non-volatile memory manager 46 allocates the use area for storing the non-volatile object in the non-volatile memory section 31. When receiving an allocation instruction, the non-volatile memory manager 46 performs the allocation process in accordance with a procedure illustrated in FIG. 5.

First, the non-volatile memory manager 46 determines whether the non-volatile object identification information is valid (S111). Specifically, the non-volatile memory manager 46 reads the non-volatile object identification information stored in the predetermined address of the non-volatile memory section 31. It is noted that when the non-volatile memory 22 is used first, the non-volatile object identification information is initialized to an unavailable value, such as for example 0. Further, when the present apparatus uses the non-volatile memory 22, the unique identification information of the present apparatus is set in the non-volatile object identification information. Then, the non-volatile memory manager 46 determines whether the non-volatile object identification information having been read matches the unique identification information of the information processing apparatus 10, as the present apparatus. When the non-volatile object identification information matches the unique identification information, the non-volatile memory manager 46 determines that the non-volatile object identification information is valid, and when the non-volatile object identification information and the unique identification information do not match each other, the non-volatile memory manager 46 determines that the non-volatile object identification information is not valid.

When the non-volatile object identification information is not valid (not matching the unique identification information) (S111, No), the non-volatile memory manager 46 initializes the non-volatile object group table (S112). Specifically, the non-volatile memory manager 46 changes a type of each non-volatile object group in the non-volatile object group table to have a value indicating an unused state. Next, the non-volatile memory manager 46 sets the non-volatile object identification information stored in the non-volatile memory section 31 to the unique identification information of the present apparatus (S113). Then, when the process of step S113 is finished, the non-volatile memory manager 46 advances the process to step S116.

When the non-volatile object identification information is valid (matching the unique identification information) (S111, Yes), the non-volatile memory manager 46 reads the non-volatile object group table, and determines whether the non-volatile object group table has a non-volatile object group of a type matching that of a non-volatile object to be allocated (S114).

When the non-volatile object group table has the non-volatile object group of a type matching that of the non-volatile object to be allocated (S114, Yes), the non-volatile memory manager 46 reads the non-volatile object bit map in the non-volatile object group. The non-volatile memory manager 46 determines whether the non-volatile object bit map has a bit indicating an unused state of the use area (S115).

When the non-volatile object group table does not have the non-volatile object group of a type matching that of the non-volatile object to be allocated (S114, No), or when the non-volatile object bit map does not have the bit indicating an unused state of the use area (S115, No), the non-volatile memory manager 46 advances the process to step S116. Further, the non-volatile object bit map of a type matching that of the non-volatile object to be allocated has the bit indicating an unused state of the use area (S115, Yes), the non-volatile memory manager 46 allocates the non-volatile object group, and advances the process to step S117.

In step S116, when any of the non-volatile object groups of the non-volatile objects has a type unused in the group information of the non-volatile object group table, the non-volatile memory manager 46 allocates the any of the non-volatile object groups, as a non-volatile object group for storing the non-volatile object as a target of the allocation instruction. Further, the non-volatile memory manager 46 sets the group information about the non-volatile object group having been allocated (type of the non-volatile object, size of the non-volatile object group, and start position of the non-volatile object group) in the non-volatile object group table (S116). When the process of step S116 is finished, the non-volatile memory manager 46 advances the process to step S117.

In step S117, the non-volatile memory manager 46 allocates any of unused areas in the non-volatile object group having been allocated, as the use area for storing the non-volatile object as a target of the allocation instruction. Further, the non-volatile memory manager 46 manipulates the non-volatile object bit map included in the non-volatile object group having been allocated to rewrite the bit indicating an unused state of the use area to the bit indicating a used state for the use area having been allocated (S117). The non-volatile memory manager 46 finishes this flow after the end of step S117.

As described above, on condition that the unique identification information stored in the non-volatile memory section 31 matches the unique identification information of the present apparatus, the non-volatile memory manager 46 reads the non-volatile object (the management information, the data information, and the like of the virtual file system) from the non-volatile memory section 31. By contrast, when the unique identification information stored in the non-volatile memory section 31 does not match the unique identification information of the present apparatus, the non-volatile memory manager 46 initializes the non-volatile memory section 31. Therefore, for example, when the non-volatile memory 22 is unused, the non-volatile memory 22 is used for another information processing apparatus, or the contents of the non-volatile memory 22 is destroyed, the non-volatile memory manager 46 can prevent invalid data stored in the non-volatile memory 22 from being read.

It is noted that, in the processes of steps S112 and S113, the non-volatile memory manager 46, does not initialize the non-volatile object group table after rewriting the nonvolatile object identification information, but rewrites the non-volatile object identification information after initializing the non-volatile object group table. Therefore, the non-volatile memory manager 46 can prevent the invalid data from being read, when power or the like is off immediately after rewriting the non-volatile object identification information.

Further, in the process of step S111, the non-volatile memory manager 46 may determine whether the non-volatile object identification information is valid, not upon receiving each allocation instruction of the non-volatile object, but upon receiving, for example, the first allocation instruction after booting. Further, when a determination result represents validity of the non-volatile object identification information, the non-volatile memory manager 46 may save the determination result for a long time.

Figure 6:
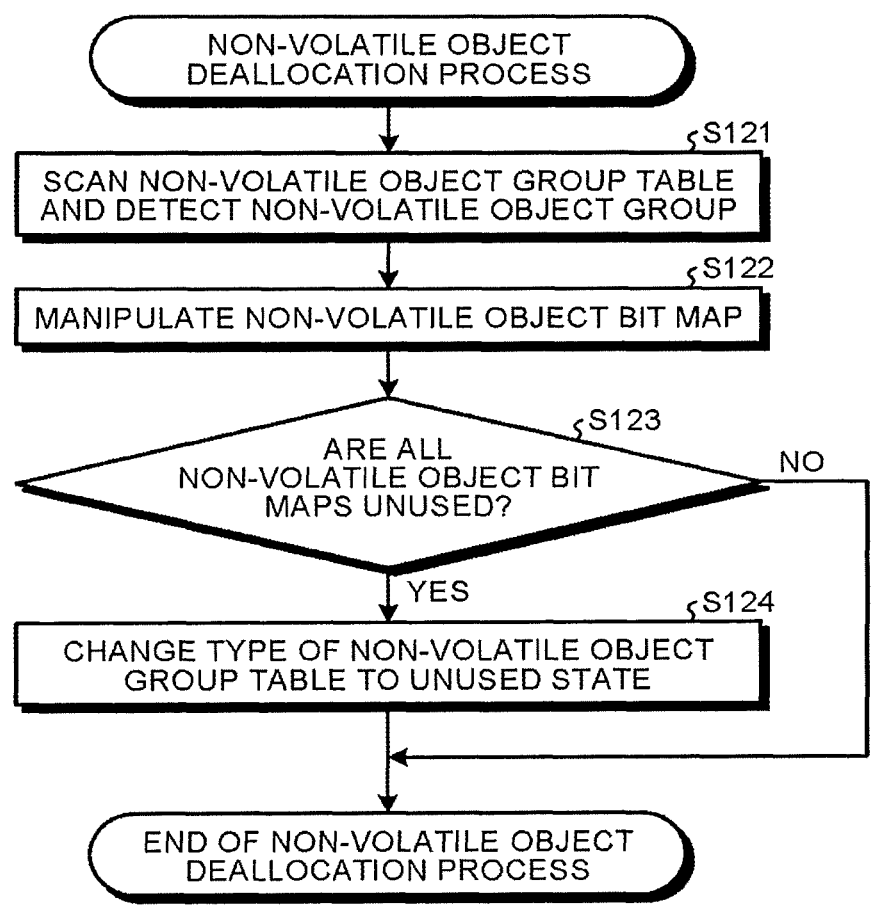
FIG. 6 is a flowchart illustrating a deallocation process.

FIG. 6 is a flowchart illustrating a deallocation process. For example, when the non-volatile object stored in the non-volatile memory section 31 is invalidated, the non-volatile memory manager 46 deallocates the use area storing the non-volatile object. When receiving a deallocation instruction, the non-volatile memory manager 46 performs the deallocation process in accordance with a procedure illustrated in FIG. 6.

First, the non-volatile memory manager 46 scans the non-volatile object group table to detect a non-volatile object group including the use area allocated for a non-volatile object being a target of the deallocation instruction (S121). Then, the non-volatile memory manager 46 rewrites a corresponding bit having a value indicating a used state in the non-volatile object bit map of the detected non-volatile object group to have a value indicating an unused state (S122). Therefore, the non-volatile memory manager 46 can deallocate the use area of the non-volatile object being a target of the deallocation instruction in a volatile object data region.

Then, as a result of rewriting the corresponding bit having the value indicating a used state to have the value indicating an unused state, the non-volatile memory manager 46 determines whether all of the bits of the non-volatile object bit map have the value indicating an unused state (S123). When any of the bits has a value indicating a used state (S123, No), the non-volatile memory manager 46 finishes this flow.

When all of the bits have the value indicating an unused state (S123, Yes), the non-volatile memory manager 46 changes the type of the non-volatile object of a corresponding entry in the non-volatile object group table to have the value indicating an unused state (S124). After the process of step S124, the non-volatile memory manager 46 finishes this flow.

Figure 7:
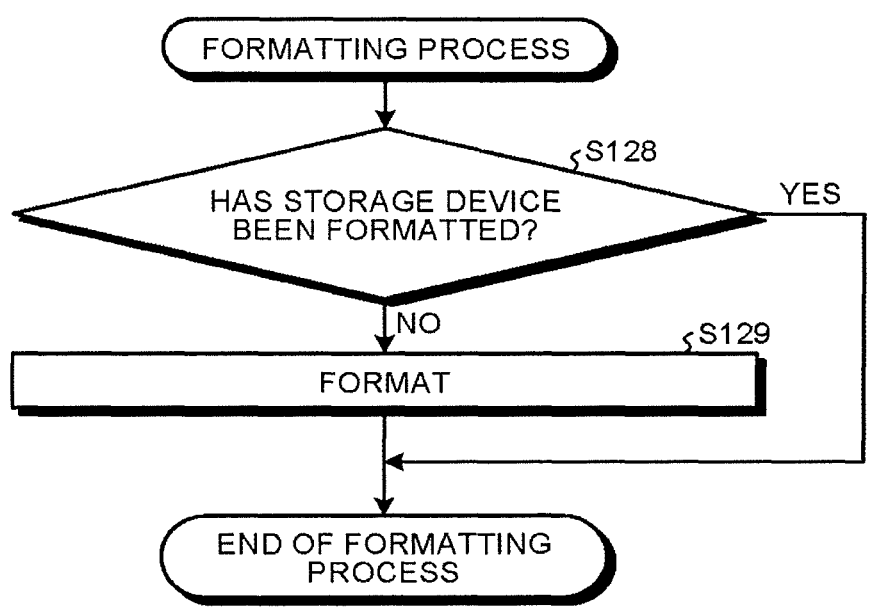
FIG. 7 is a flowchart illustrating formatting process.

FIG. 7 is a flowchart illustrating formatting process for the storage device 24. For example when the storage device 24 is connected, the information processing apparatus 10 performs the process in accordance with a procedure illustrated in FIG. 7.

When the storage device 24 is connected, the operating system 36 determines whether the storage device 24 has been formatted (S128). When the storage device 24 is not formatted (S128, No), the operating system 36 formats the storage device 24 with a specified file system (S129). In this condition, the operating system 36 may divide the storage device 24 into the plurality of partitions according to user's specification, and format each partition with a specified file system.

After formatting, the storage section 33 is formed in the storage device 24, and can be recognized by the operating system 36. Further, after formatting, the storage section 33 has the super block information storing file system identification information for identification of the file system. For example, the super block information stores a universally unique identifier (UUID) of the file system, generated by a method defined by RFC4122.

When the storage device 24 has been formatted (S128, Yes) or the storage device 24 is formatted in step S129, the operating system 36 finishes the process.

Figure 8:
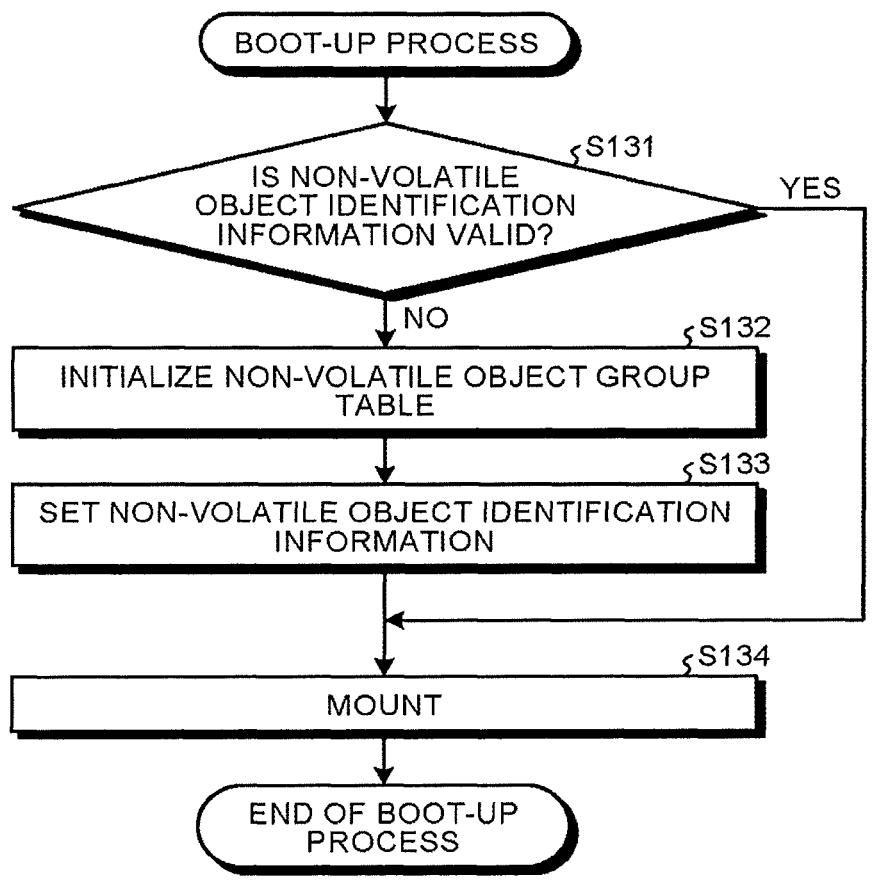
FIG. 8 is a flowchart of a boot-up process of the information processing apparatus.

FIG. 8 is a flowchart of a boot-up process of the information processing apparatus 10. Upon booting, the information processing apparatus 10 performs the process in accordance with a procedure illustrated in FIG. 8.

First, the non-volatile memory manager 46 determines whether the non-volatile object identification information is valid (S131). Specifically, the non-volatile memory manager 46 reads the non-volatile object identification information stored in the predetermined address of the non-volatile memory section 31. Then, the non-volatile memory manager 46 determines whether the non-volatile object identification information having been read matches the unique identification information of the information processing apparatus 10, as the present apparatus. When the non-volatile object identification information matches the unique identification information, the non-volatile memory manager 46 determines that the non-volatile object identification information is valid, and when the non-volatile object identification information and the unique identification information do not match each other, the non-volatile memory manager 46 determines that the non-volatile object identification information is not valid.

When the non-volatile object identification information is not valid (S131, No), the non-volatile memory manager 46 initializes the non-volatile object group table (S132). Then, the non-volatile memory manager 46 sets the non-volatile object identification information stored in the non-volatile memory section 31 to the unique identification information of the present apparatus (S133).

When the non-volatile object identification information is valid (S131, Yes) or the process of step S133 is finished, the operating system 36 recognizes the storage device 24 such as SSD or HDD, and mounts the storage section 33 (S134). When the storage section 33 is mounted, the operating system 36 sets a target device, a mount point, and a mount option according to user's instruction or the like.

The operating system 36 specifies, as the target device, a partition or the like of the storage section 33. The operating system 36 receives setting of a non-volatile cache mode, a recovery mode, and a write-back mode as the mount option.

The non-volatile cache mode is a mode for causing the non-volatile memory section 31 to cache the management information (common super block information and common inode information) and the data information of the virtual file system. When the non-volatile cache mode is set, the virtual manager 45 causes the non-volatile memory section 31 to cache the management information and the data information of the virtual file system to be read after rebooting. When the non-volatile cache mode is not set, the non-volatile memory manager 46 does not function, and the volatile memory manager 47 causes the volatile memory section 32 to cache the management information and the data information of the virtual file system.

The recovery mode is a mode for reusing the management information and the data information of the virtual file system stored in the non-volatile memory section 31. When the recovery mode is set, the virtual manager 45 uses the management information and the data information of the virtual file system stored in the non-volatile memory section 31, upon mounting the storage section 33, in order to manage files stored in the mounted storage section 33. When the recovery mode is not set, the virtual manager 45 deallocates and invalidates the management information and the data information of the virtual file system stored in the non-volatile memory section 31, upon mounting the storage section 33. Then, the virtual manager 45 causes the non-volatile memory section 31 to cache new management information and data information of the virtual file system stored in the mounted storage section 33.

The write-back mode is a mode for writing the management information and the data information of the virtual file system back to the storage section 33. When the write-back mode is set, the non-volatile memory manager 46 writes the management information and the data information of the virtual file system stored in the non-volatile memory section 31 back to the storage section 33, upon unmounting the storage section 33. Then, the non-volatile memory manager 46 deallocates and invalidates the management information and the data information of the virtual file system stored in the non-volatile memory section 31. When the write-back mode is not set, the non-volatile memory manager 46 does not perform write-back, and maintains the validation of the management information and the data information of the virtual file system stored in the non-volatile memory section 31, upon unmounting the storage section 33.

It is noted that, in the present embodiment, unless otherwise specifically described, the non-volatile cache mode and the recovery mode are set in the information processing apparatus 10, and the write-back mode is not set.

Upon mounting the storage section 33, the virtual manager 45 reads the super block information of the storage section 33 being a specified target device. The virtual manager 45 reads the file system identification information set upon formatting, from the read super block information.

The virtual manager 45 compares the file system identification information stored in the storage section 33, with file system identification information stored in the super block information stored in the non-volatile memory section 31. On condition that the file system identification information stored in the storage section 33 matches the file system identification information included in the super block information stored in the non-volatile memory section 31, the non-volatile memory manager 46 allows use of the information stored in the non-volatile memory section 31 for management of the files stored in the mounted storage section 33. After the process of step S134, the information processing apparatus 10 finishes this flow, and allows access to the storage section 33.

Figure 9:
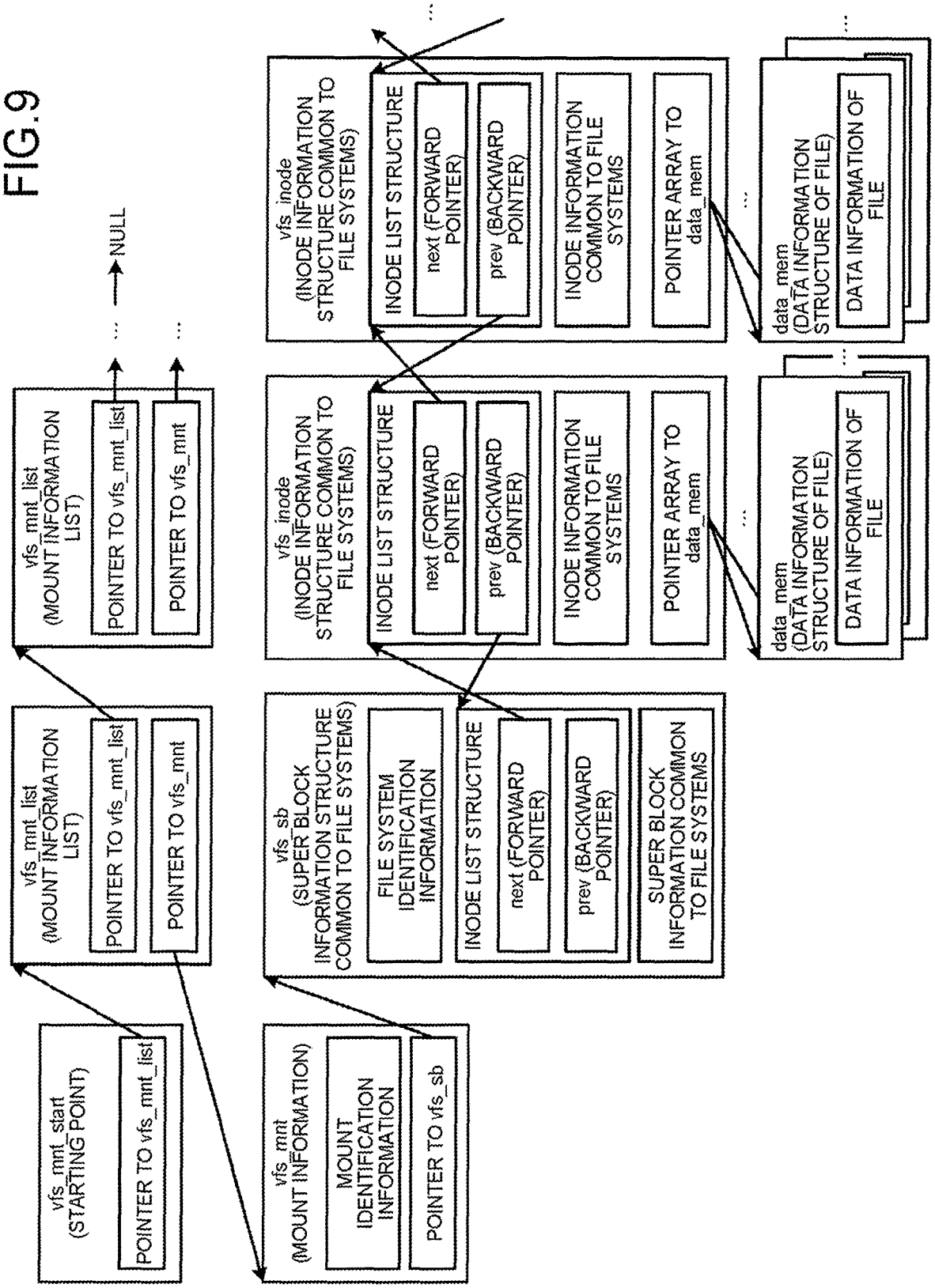
FIG. 9 is a diagram illustrating a data_structure held in a main memory device of a virtual file system.

FIG. 9 is a diagram illustrating a data_structure held in the main memory device of the virtual file system. The virtual manager 45 manages data stored in the plurality of storage sections 33, in files, by the virtual file system being a framework for handling the plurality of different file systems in common.

Specifically, the virtual manager 45 manages data by causing the non-volatile memory section 31 to store, as the non-volatile object, vfs_mnt_start, vfs_mnt_list, vfs_mnt, vfs_sb, vfs_inode, and data_mem, as illustrated in FIG. 9. The vfs_sb, the vfs_inode, and the data_mem include information of a cache of the storage section 33.

The vfs_mnt_start represents a starting point. The vfs_mnt_list represents a mount information list. The vfs_mnt represents mount information. The virtual manager 45 sets the vfs_mnt for each storage section 33 mounted to the present apparatus. That is, the virtual manager 45 sets the vfs_mnt for each of the file systems managed in common by the virtual file system.

The virtual manager 45 sets one vfs_mnt_start. The virtual manager 45 sets the vfs_mnt_list corresponding to each vfs_mnt. The vfs_mnt_list includes a pointer to a corresponding vfs_mnt. It is noted that the pointer represents information showing absence of an address of another non-volatile object or a non-volatile object to be indicated.

Each vfs_mnt_list constitutes a list associated with the pointers in series from the vfs_mnt_start. That is, the vfs_mnt_start and the vfs_mnt_list function as information for searching for the vfs_mnt. Specifically, the vfs_mnt_start includes the pointer to the first vfs_mnt_list. Each vfs_mnt_list includes the pointer to a next vfs_mnt_list. The last vfs_mnt_list includes the pointer indicating a value (e.g., NULL being pointer indicating 0) indicating absence of the next list. Therefore, the virtual manager 45 can quickly finds an objective vfs_mnt from among the non-volatile objects stored in the non-volatile memory section 31, sequentially tracing the vfs_mnt_list from the vfs_mnt_start.

The vfs_mnt includes the pointer to mount identification information and the pointer to the vfs_sb. The mount identification information is information for identification of the storage section 33, and includes information of the target device, the mount point, and the like.

The vfs_sb is a super block information structure common to the file systems. The virtual manager 45 basically sets one vfs_sb corresponding to one set of mount information vfs_mnt. However, when the same storage sections 33 are mounted to a plurality of positions, a plurality of vfs_mnt may be set to indicate one vfs_sb.

The vfs_sb includes the file system identification information, an inode list structure, and the super block information common to the file systems (overall management information). The file system identification information stores the file system identification information or the like. The inode list structure is information for searching for inode information common to the file systems. The super block information common to the file systems is information described in a format common to the different file systems, for overall management of the corresponding file system.

The vfs_inode is an inode information structure common to the file systems. The virtual manager 45 sets the vfs_inode for each file belonging to the corresponding file system.

The vfs_inode includes the inode list structure, the inode information common to the file systems (file management information), and a pointer array to the data_mem. The inode information common to the file systems is information described in a format common to the different file systems, for management of corresponding files. The pointer array to the data_mem includes one or more pointers to the data_mem.

The inode list structures included in the vfs_sb and each vfs_inode constitute a list associated with the pointers in series from the vfs_sb. That is, the inode list structure functions as information for searching for an objective vfs_inode. Specifically, the inode list structure includes a pointer (next) to a next vfs_inode, and a pointer (prev) to a previous vfs_sb or vfs_inode. The pointer (prev) included in the vfs_sb and the pointer (next) included in the last vfs_inode indicate a value (e.g., NULL being a pointer indicating 0) indicating the absence of the previous or next structure. Therefore, the virtual manager 45 can quickly find an objective vfs_inode from among the non-volatile objects stored in the non-volatile memory section 31, tracing the inode list structures back and forth.

The data_mem is a structure storing data information of a corresponding file. The data_mem stores the data information of the file in pages. In the virtual manager 45, the data_mem may be multiply provided for one file.

The non-volatile object having such a configuration is stored in the non-volatile memory section 31, so that the virtual manager 45 can read the data information of a file stored on all storage sections 33. Further, the starting point can be read from the non-volatile object group table read from a predetermined address of the non-volatile memory section 31. Further, the virtual manager 45 searches for the non-volatile object subordinate to the mount information to search for the super block information, the inode information, and the data information belonging to the file system managing the corresponding storage section 33.

As described above, the virtual manager 45 can sequentially trace the pointers and the lists from the starting point to read the super block information common to the file systems (overall management information), the inode information common to the file systems (file management information) and the data information, tracing the data stored at the predetermined address in the non-volatile memory section 31.

Figure 10:
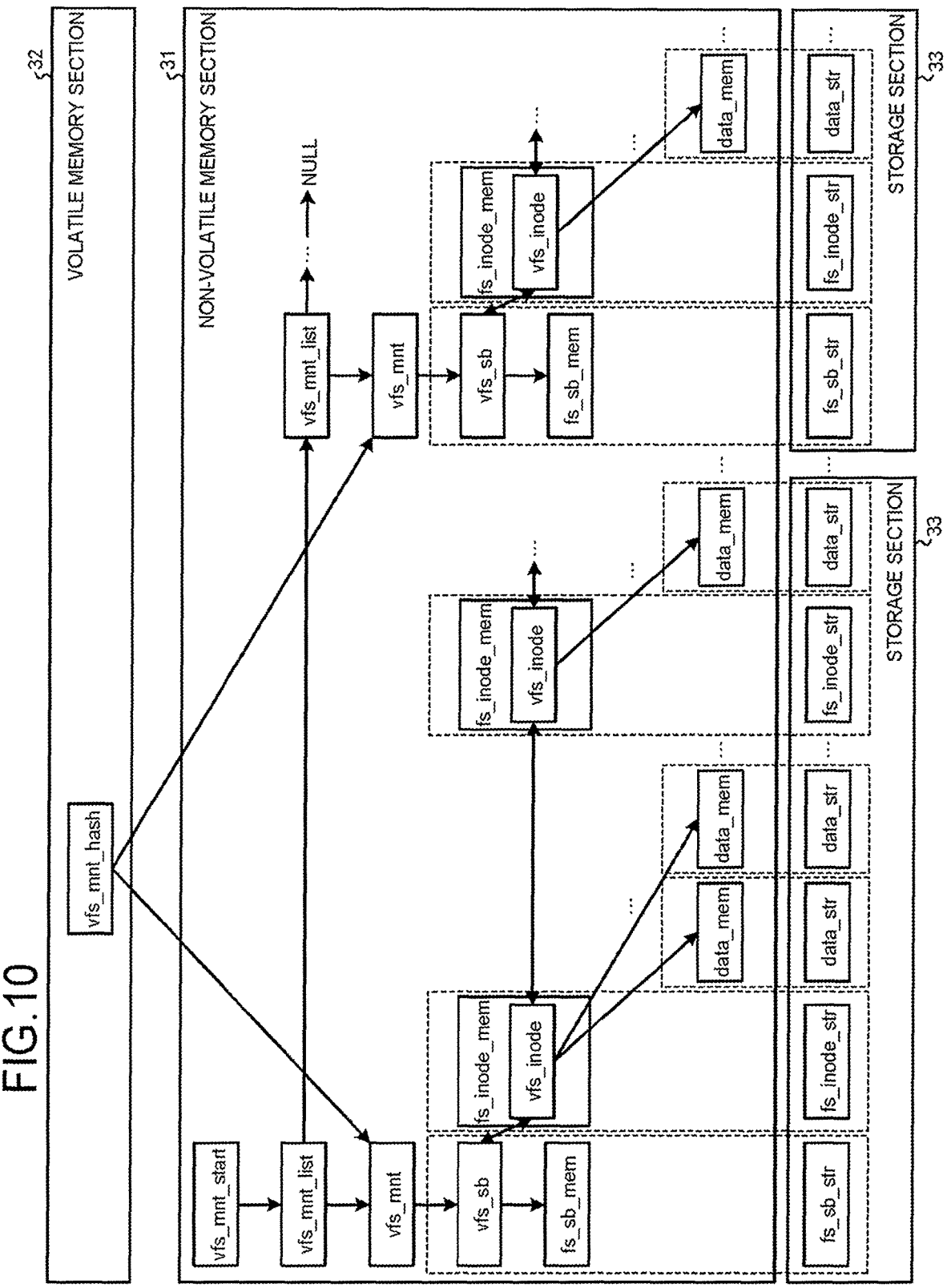

FIG. 10 is a diagram illustrating a relationship between information stored in the non-volatile memory section 31, the volatile memory section 32, and the storage section 33. The virtual manager 45 causes the non-volatile memory section 31 to store, as the non-volatile object, the vfs_mnt_start, the vfs_mnt_list, the vfs_mnt, the vfs_sb, fs_sb_mem, the vfs_inode, fs_inode_mem, and the data_mem.

The fs_sb_mem is associated with the vfs_sb and stored in the non-volatile memory section 31. The fs_sb_mem is a structure including super block information specific to a file system for management of files stored in a corresponding storage section 33. The fs_inode_mem is a structure including inode information specific to a file system and the inode information common to the file systems (vfs_inode).

Further, the virtual manager 45 causes each storage section 33 to store fs_sb_str, fs_inode_str, and data_str. The fs_sb_str is a structure including the super block information specific to a file system and the super block information common to the file systems. The fs_inode_str is a structure including the inode information specific to a file system and the inode information common to the file systems. The data_str is a structure including the data information of a file.

Here, the virtual manager 45 manages the fs_sb_str stored in the storage section 33, in association with the vfs_sb and the fs_sb_mem stored in the non-volatile memory section 31. Further, the virtual manager 45 manages the fs_inode_str stored in the storage section 33, in association with the fs_inode_mem being a cache stored in the non-volatile memory section 31. Further, the virtual manager 45 manages the data_str store in the storage section 33, in association with the data_mem being a cache stored in the non-volatile memory section 31.

It is noted that, when causing the non-volatile memory section 31 to store the non-volatile object, the virtual manager 45 allocates the use area for the corresponding non-volatile object, using the non-volatile memory manager 46, in accordance with a procedure illustrated in FIG. 5. Therefore, the virtual manager 45 can read the corresponding non-volatile object from the non-volatile memory section 31 without accessing, hereinafter, the storage section 33. Further, when the non-volatile object is invalidated, the virtual manager 45 deallocates the use area of the corresponding non-volatile object, using the non-volatile memory manager 46, in accordance with a procedure illustrated in FIG. 6.

Further, upon mounting the storage section 33, the virtual manager 45 allocates and stores the use areas for the vfs_mnt_start, the vfs_mnt_list, and the vfs_mnt. It is noted that, when any another storage section 33 has been mounted, the virtual manager 45 sets a pointer from an existing vfs_mnt_list to the vfs_mnt_list allocated this time, for the vfs_mnt_start.

Further, upon unmounting the storage section 33, the virtual manager 45 deallocates the use areas of the vfs_mnt_list and the vfs_mnt. Further, when all storage sections 33 are unmounted, the virtual manager 45 may deallocate the use area of the vfs_mnt_start.

Further, the virtual manager 45 causes the volatile memory section 32 to store vfs_mnt hash, using the volatile memory manager 47. The vfs_mnt hash is a hash list used for searching for a file pathname. When the storage section 33 is mounted, the virtual manager 45 adds the pointer or the like to the corresponding mount information vfs_mnt to the hash list to connect the mount information vfs_mnt to the hash list vfs_mnt hash. Therefore, the virtual manager 45 can read the non-volatile object belonging to the file system of each storage section 33 traced from the mount information vfs_mnt.

Figure 11:
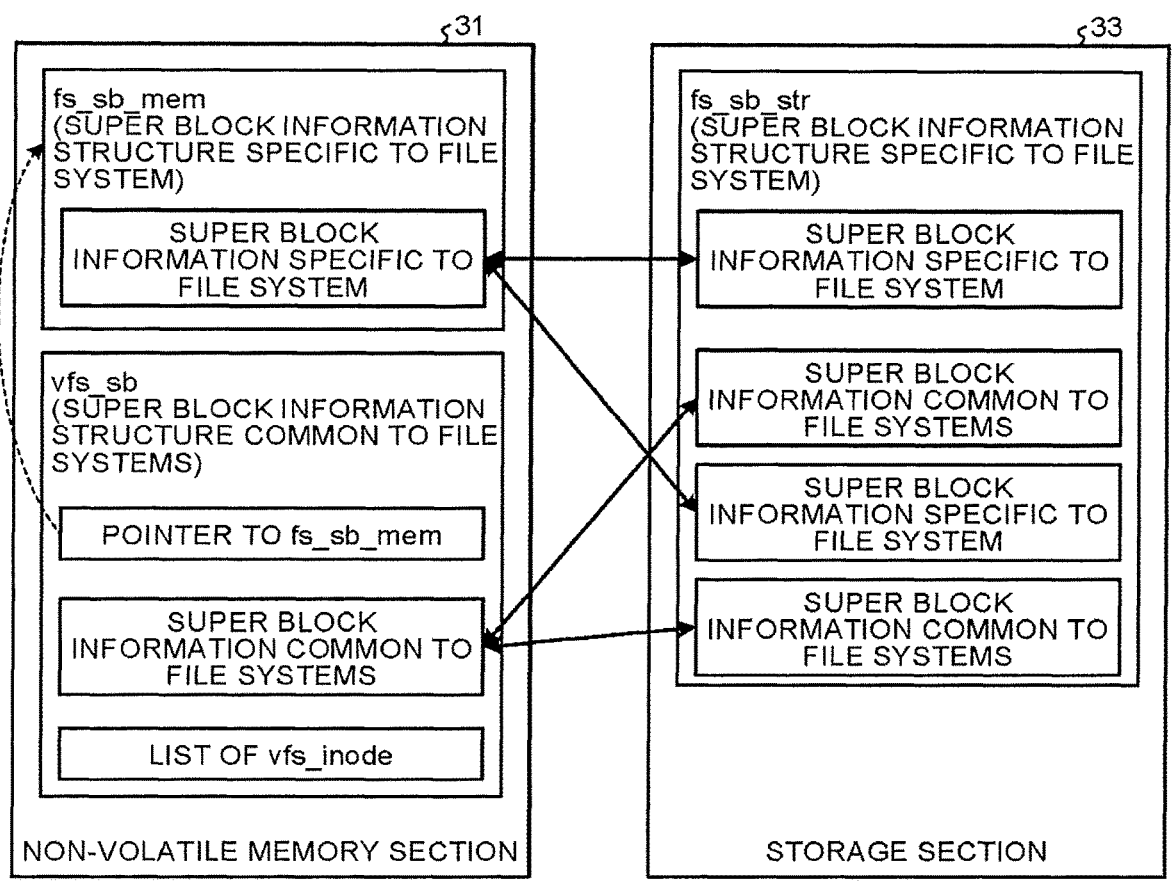
FIG. 11 is a diagram illustrating super block information.

FIG. 11 is a diagram illustrating a relationship between the super block information stored in the non-volatile memory section 31 and the super block information stored in the storage section 33.

The vfs_sb and the fs_sb_mem are stored in the non-volatile memory section 31. The vfs_sb is a structure including the super block information common to the file systems. The fs_sb_mem is a structure including the super block information specific to a file system. The vfs_sb includes the pointer to the fs_sb_mem. The pointer to the fs_sb_mem can associate the vfs_sb and the fs_sb_mem.

Upon mounting the storage section 33, the virtual manager 45 reads each of the super block information common to the file systems and the super block information specific to a file system from the fs_sb_str on the storage section 33, allocates the use areas for the vfs_sb and the fs_sb_mem, and causes the non-volatile memory section 31 to cache each of the read the super block information common to the file systems and the super block information specific to a file system. The virtual manager 45 allocates separated use areas for the vfs_sb and the fs_sb_mem. Therefore, the virtual manager 45 can define the fs_sb_mem to have an original size.

The virtual manager 45 causes the non-volatile memory section 31 to cache the super block information as described above, and can update the super block information without accessing the storage section 33 each time. As a result, the virtual manager 45 can speed up access to the super block information.

Figure 12:
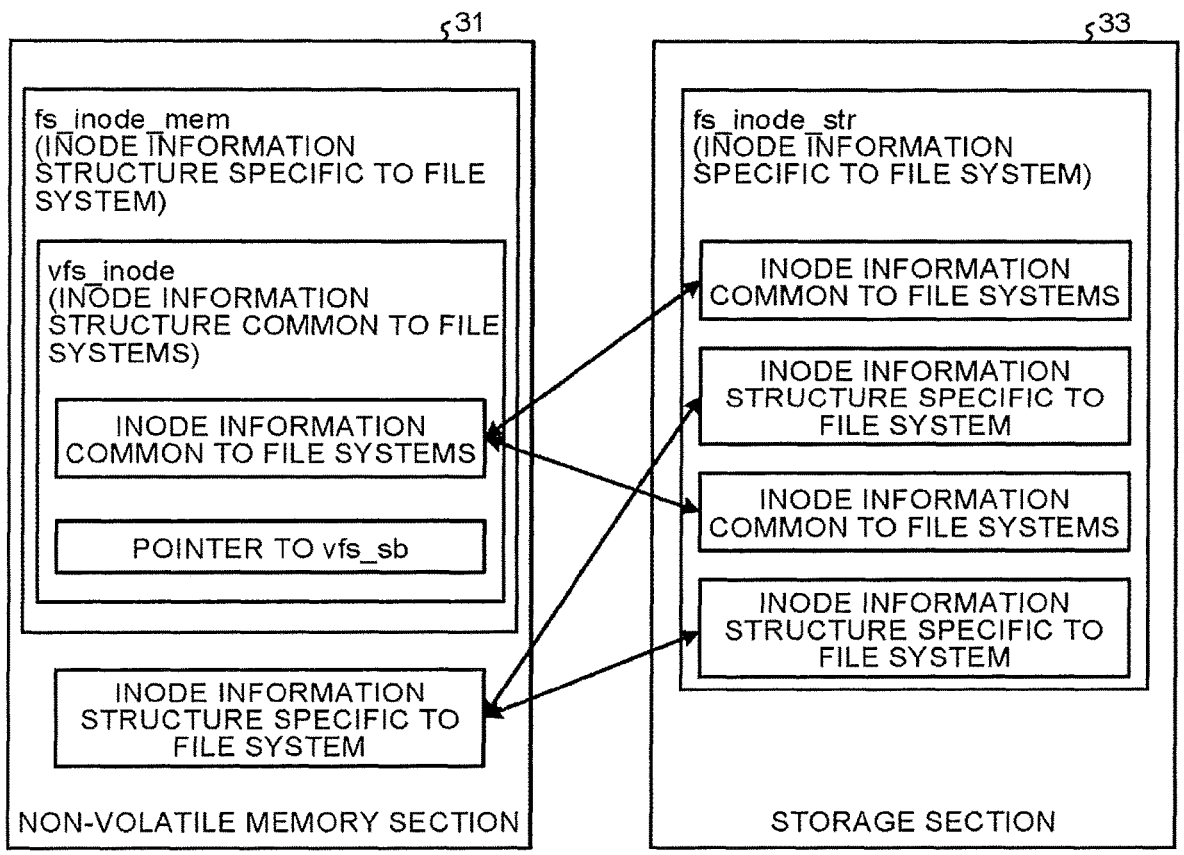
FIG. 12 is a diagram illustrating inode information.

FIG. 12 is a diagram illustrating a relationship between the inode information stored in the non-volatile memory section 31 and the inode information stored in the storage section 33.

The fs_inode_mem is stored in the non-volatile memory section 31. Further, the vfs_inode is included in the fs_inode_mem. The fs_inode_mem is a structure including the inode information specific to the file system. The vfs_inode is a structure including the inode information common to the file systems. The vfs_inode may include the pointer to the vfs_sb. Therefore, the virtual manager 45 can reference the super block information from the inode information.

When the inode information common to the file systems and the inode information specific to a file system have not been cached, for example upon reference to a file, the virtual manager 45 reads each of the inode information common to the file systems and the inode information specific to a file system from the fs_inode_str on the storage section 33, allocates the use areas for the fs_inode_mem and the vfs_inode, and causes the non-volatile memory section 31 to cache each of the read inode information common to the file systems and the inode information specific to a file system.

Further, when a new file is created in the absence of a file, the virtual manager 45 allocates the use areas for the fs_inode_mem and the vfs_inode, and writes each of the inode information common to the file systems and the inode information specific to a file system to the non-volatile memory section 31. At this time, information of a free inode is searched for from information of the super block, and determines a position of the fs_inode.

The virtual manager 45 causes the non-volatile memory section 31 to cache the inode information as described above, and can update the inode information without accessing the storage section 33 each time. As a result, the virtual manager 45 can speed up access to the inode information.

Figure 13:
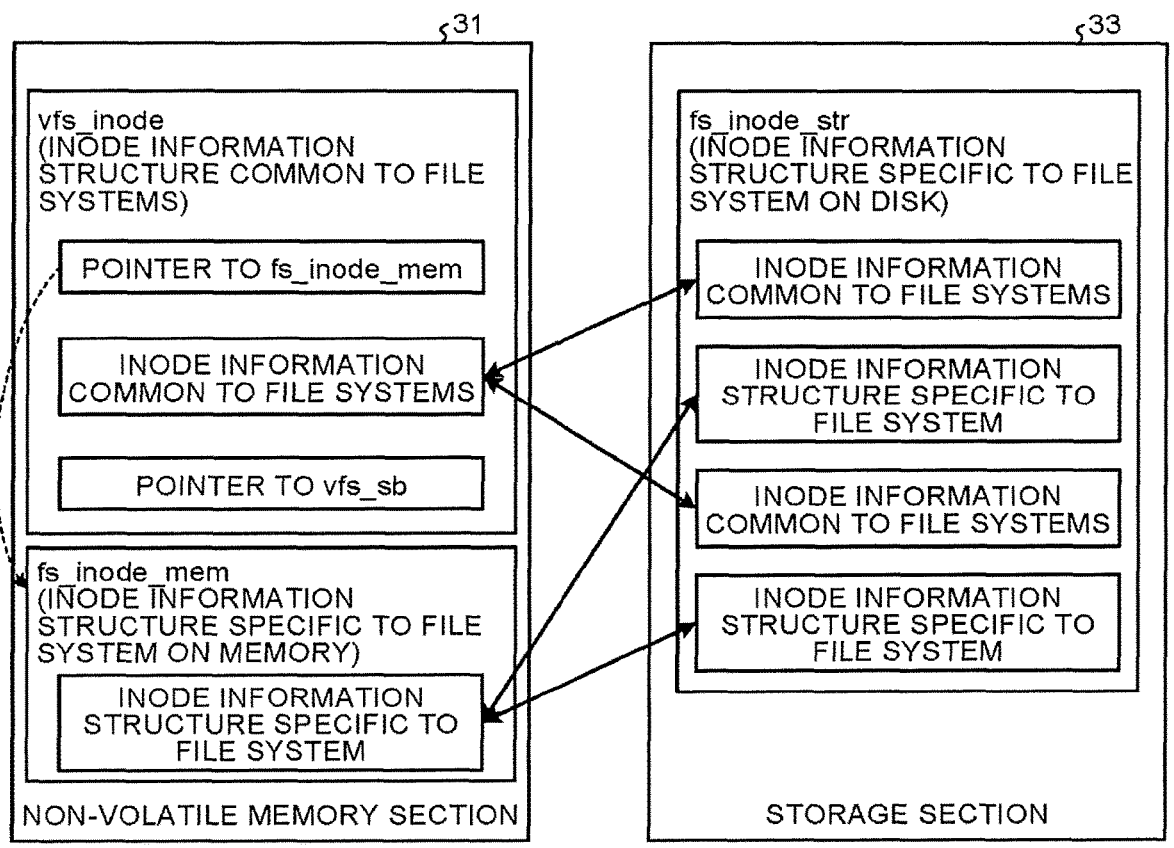
FIG. 13 is a diagram illustrating another example of the inode information.

FIG. 13 is a diagram illustrating another example of a relationship between the inode information stored in the non-volatile memory section 31 and the inode information stored in the storage section 33.

In the non-volatile memory section 31, the vfs_inode may not be included in the fs_inode_mem, but may be stored separately from the fs_inode_mem. In this configuration, the vfs_inode includes the pointer to the fs_inode_mem.

The data_mem and the data_str are data information. The data_mem is stored in the non-volatile memory section 31, and the data_str is stored in the storage section 33. The data_str corresponds to a data block of the storage section 33. The data_mem may store information about the position of the data_str to quickly obtain the corresponding data_str.

Figure 14:
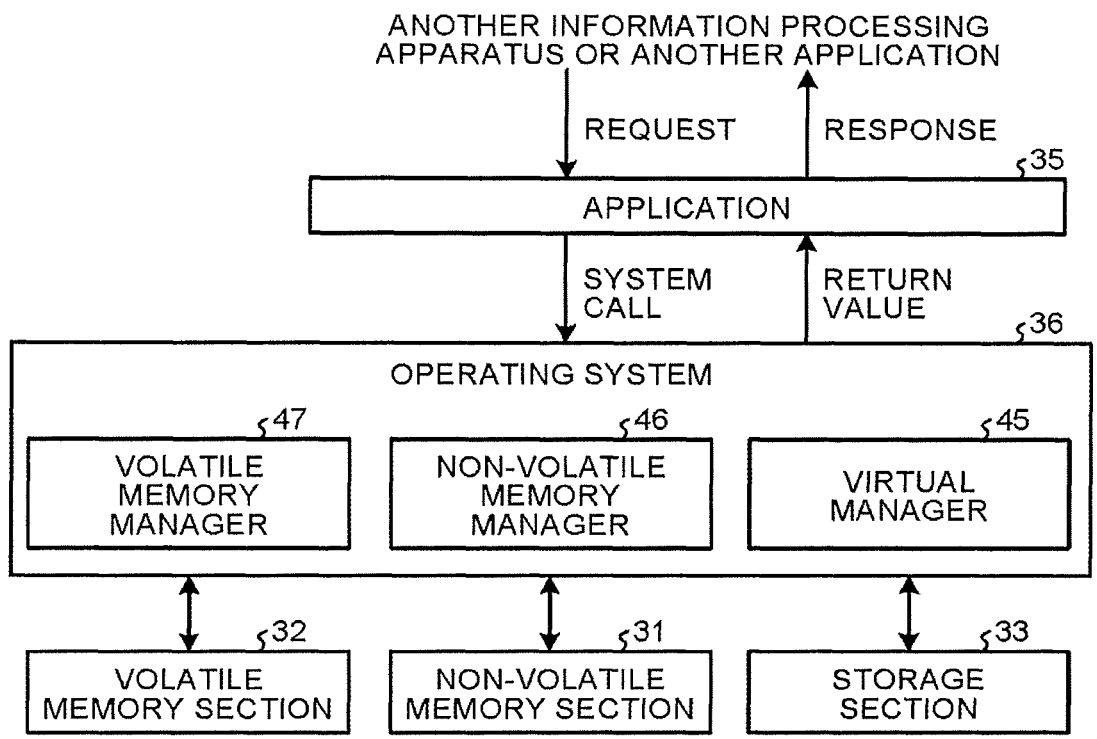
FIG. 14 is a diagram illustrating a relationship between an application and an operating system.

FIG. 14 is a diagram illustrating a relationship between the application 35 and the operating system 36.

When receiving a request for reading or writing data from another information processing apparatus through the network, the application 35 functioning as the database reads or writes the data from or to a file. Then, the application 35 adds a result of the reading or writing to a response, and returns the response to the another information processing apparatus through the network. It is noted that the application 35 may receive the request for reading or writing data from another application operated in the present apparatus in place of the another information processing apparatus.

The application 35 performs such file operation or the like through the API provided by the operating system 36. A position of the storage section 33 at which the database is stored is described by file pathname or the like in a configuration file or the like. The application 35 reads the configuration file upon booting, and obtains a file path in which the database is stored.

The application 35 specifies the file path and an access mode (read only, write only, read-write, etc), and opens the file with the open system call. In this condition, first, the virtual manager 45 searches for a corresponding inode information from the super block information cached in the non-volatile memory section 31.

When the non-volatile memory section 31 does not have a cache of the corresponding inode information, the virtual manager 45 reads the inode information from the storage section 33, and causes the non-volatile memory section 31 to cache the read inode information through the non-volatile memory manager 46. When the corresponding inode information is cached in the non-volatile memory section 31, the virtual manager 45 allocates an identification information region of the application 35, called the file descriptor, in the volatile memory section 32 through the volatile memory manager 47. The file descriptor is passed, as a return value of the open system call, to the application 35. The application 35 subsequently uses this file descriptor to perform operation to a corresponding file.

Further, the application 35 can also access the file using the read system call, the write system call, or the mmap system call.

The application 35 can read data information from the file using the read system call. When reading the data information from the file, the application 35 specifies the file descriptor and an address and a size of a read source buffer, as arguments, and calls the read system call. When receiving the read system call, the virtual manager 45 references a pointer array to data information of the inode information of the corresponding file, and checks whether the data information to be read is cached in the non-volatile memory section 31.

When the data information to be read is cached, the virtual manager 45 copies a specified size of the data information having been cached in the non-volatile memory section 31 to a position of the read source buffer specified by the application 35. When the data information to be read is not cached, the virtual manager 45 reads the data information from the storage section 33, caches the read data information in the non-volatile memory section 31, and copies the specified size of the data information to the position of the read source buffer specified by the application 35. It is noted that the non-volatile memory manager 46 causes the non-volatile memory section 31 to cache the data information in pages.

Further, the application 35 can write data information to the file using the write system call. When the data information is written to the file, the application 35 calls the write system call with the file descriptor and an address and a size of a buffer storing the data information to be written, as arguments. When receiving the write system call, the virtual manager 45 references the pointer array to data information, of the inode information in the corresponding file, and checks whether the data information to be written is cached in the non-volatile memory section 31.

When the data information to be written is cached, the virtual manager 45 copies a specified size of the data information to be written from a position of the buffer specified by the application 35, to a position of the data information having been cached in the non-volatile memory section 31. When the data information to be written is not cached, the virtual manager 45 reads the data information from the storage section 33, caches the read data information in the non-volatile memory section 31, and copies the specified size of the data information from the position of the buffer specified by the application 35, to the position of the read data information. It is noted that the non-volatile memory manager 46 causes the non-volatile memory section 31 to cache the data information in pages.

Further, the application 35 can also access data information of the file using the mmap system call. When accessing the data information of a file using the mmap system call, the application 35 calls the mmap system call with an address and a size of the data information to be memory-mapped, a type of memory protection, and a flag, as arguments. The application 35 specifies a manner of memory protection of the mapping according to the type of memory protection.

The application 35 specifies, for example, combined executable, readable/writable, and writable information as the type of memory protection. The application 35 specifies for example whether to share the mapped data information, using a flag.

When receiving the mmap system call, the virtual manager 45 sets the MMU to generate page fault when the mapped address is accessed. A page fault handler is set to read corresponding data information in pages from the storage section 33, and cache the read data information. For example, when data information is read from or data information is written to the mapped address where the corresponding data information is not cached, the MMU generates the page fault. Then, after the data information is cached, the MMU performs reading or writing for the cached data information. When the corresponding data information is cached, the MMU performs reading or writing for the cached data information.

It is noted that, in the present embodiment, the operating system 36 supports the fsync system call and the msync system call for performing synchronization of data to the storage section 33. However, even if the fsync system call and the msync system call are called, the operating system 36 does not perform write-back to the storage section 33, and writes data of the non-volatile memory 22 in order from the processor 21.

For example, for planned termination of service, the user terminates the application 35 functioning as the database. When the application 35 is terminated, the operating system 36 performs similar processing to that upon calling the close system call, for all files referenced by the application 35 in the open system call. When all applications 35 referencing the files of the mounted storage section 33 are removed, the user can unmount the storage section 33.

Figure 15:
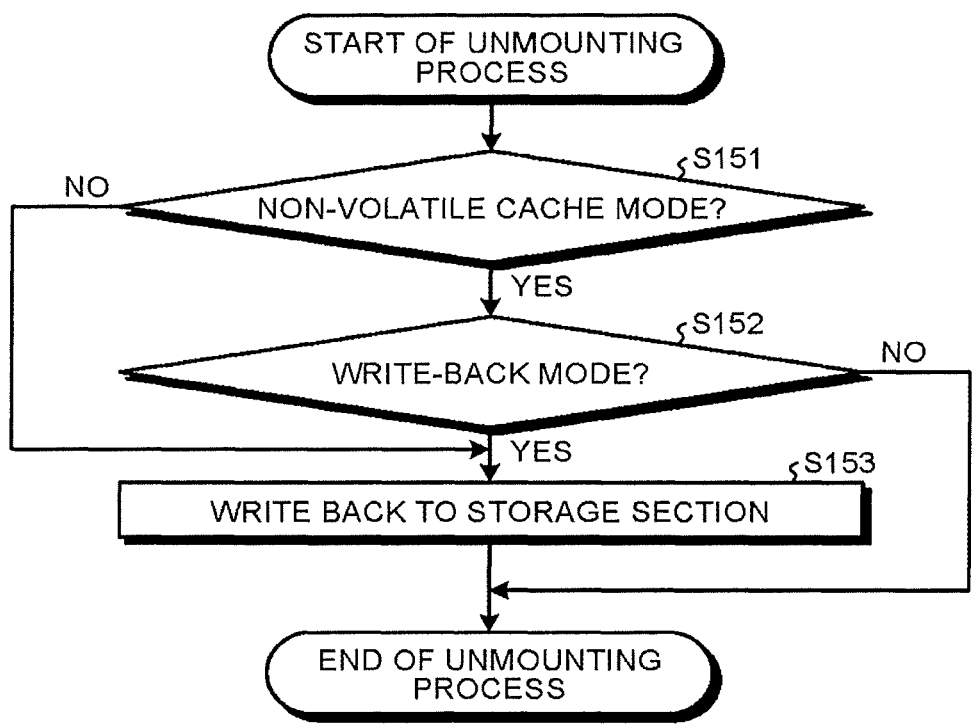
FIG. 15 is a flowchart illustrating an unmounting process of the storage section.

FIG. 15 is a flowchart illustrating an unmounting process of the storage section 33. Upon unmounting the storage section 33, the virtual manager 45 performs the process in accordance with a procedure illustrated in FIG. 15.

First, the virtual manager 45 determines whether the non-volatile cache mode is set (S151). When the non-volatile cache mode is not set (S151, No), the virtual manager 45 advances the process to step S153. When the non-volatile cache mode is set (S151, Yes), the virtual manager 45 further determines whether the write-back mode is set (S152). When the write-back mode is set (S152, Yes), the virtual manager 45 advances the process to step S153.

When the non-volatile cache mode is not set (S151, No) or when the write-back mode is set (S152, Yes), in step S153, the virtual manager 45 writes the management information and the data information of the virtual file system cached in the non-volatile memory section 31 back to the storage section 33 (S153). That is, the virtual manager 45 writes the super block information, the inode information, and the data information stored in the non-volatile memory section 31 back to the storage section 33. Then, the virtual manager 45 deallocates the use areas of the super block information, the inode information, and the data information, using the non-volatile memory manager 46, and finishes the process. Therefore, the information processing apparatus 10 can remove for example the non-volatile memory 22.

By contrast, when the non-volatile cache mode is set, and the write-back mode is not set (S152, No), the virtual manager 45 does not write back the data cached in the non-volatile memory section 31, and keeps the data cached in the non-volatile memory section 31. Therefore, the information processing apparatus 10 can reduce a process time upon unmounting the storage section 33. Further, the information processing apparatus 10 can also reduce a process time upon remounting the storage section 33.

Figure 16:
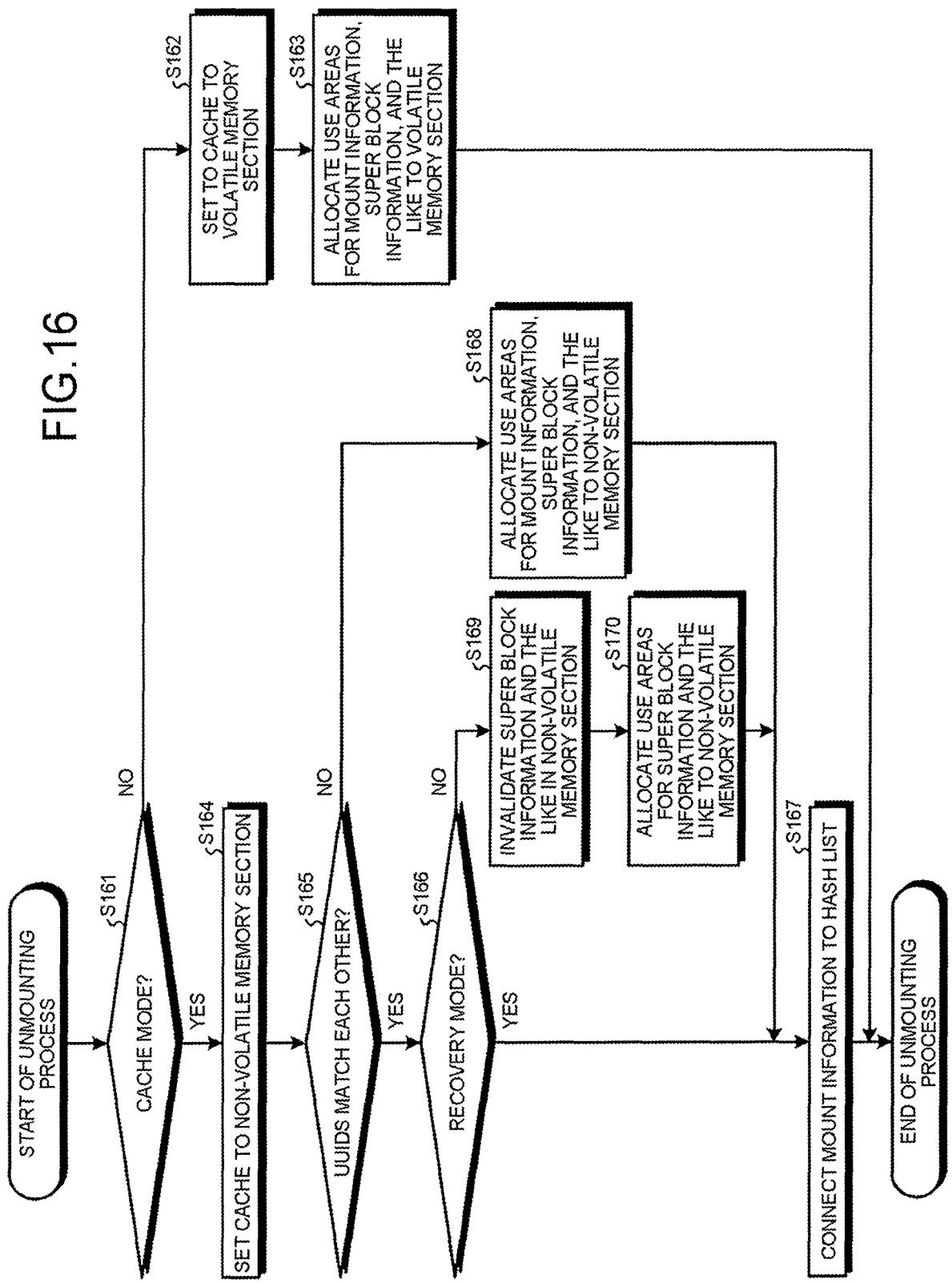
FIG. 16 is a flowchart illustrating a mounting process of the storage section.

FIG. 16 is a flowchart illustrating a process of mounting the storage section 33. Upon mounting the storage section 33, the virtual manager 45 performs processing in accordance with a procedure illustrated in FIG. 16.

First, the virtual manager 45 determines whether the non-volatile cache mode is set (S161). When the non-volatile cache mode is not set (S161, No), the virtual manager 45 sets the mount information, the super block information, the inode information, the data information, and the like to be cached in the volatile memory section 32 using the volatile memory manager 47 (S162). Then, the virtual manager 45 allocates the use areas for the mount information, the super block information, and the like to the volatile memory section 32, using the volatile memory manager 47 (S163), and finishes this flow. As described above, when the non-volatile cache mode is not set, the virtual manager 45 can cache the super block information, data information, and the like so that the super block information, data information, and the like cannot be restored after rebooting.

When the non-volatile cache mode is set (S161, Yes), the virtual manager 45 sets the mount information, the super block information, the inode information, the data information, and the like to be cached in the non-volatile memory section 31 using the non-volatile memory manager 46 (S164). As described above, when the non-volatile cache mode is set, the virtual manager 45 can cache the super block information, the data information, and the like so that the super block information, the data information, and the like can be restored after rebooting.

After S164, the virtual manager 45 reads the file system identification information (UUID) included in the super block information stored in the mounted storage section 33, and the file system identification information included in the super block information stored in the non-volatile memory section 31. Then, the virtual manager 45 determines whether the file system identification information on the mounted storage section 33, matches the file system identification information on the non-volatile memory section 31 (S165).

It is noted that, when the super block information belonging to a plurality of file systems is stored in the non-volatile memory section 31, the virtual manager 45 traces the mount information list, and reads the file system identification information from the super block information belonging to all of the file systems. The virtual manager 45 determines whether the file system identification information on the storage section 33, matches any of the file system identification information on the non-volatile memory section 31.

As a result of the determination, when the file system identification information match each other, the super block information, data information, and the like belonging to the file system of the mounted storage section 33 have been cached in the non-volatile memory section 31. While, as a result of the determination, when the file system identification information do not match each other, the super block information, data information, and the like belonging to the file system of the mounted storage section 33 has not been cached in the non-volatile memory section 31.

When none of the file system identification information match each other (S165, No), the virtual manager 45 advances the process to step S168. When the file system identification information match each other (S165, Yes), the virtual manager 45 further determines whether the recovery mode is set (S166). When the recovery mode is set (S166, Yes), the virtual manager 45 advances the process to step S167. When the recovery mode is not set (S166, No), the virtual manager 45 advances the process to step S169.

In step S167, the virtual manager 45 connects the mount information corresponding to the super block information having the matching file system identification information, to the hash list stored in the volatile memory section 32. Therefore, the virtual manager 45 can read the super block information. Further, the virtual manager 45 can also read the inode information and the data information traced from the super block information.

That is, the virtual manager 45 can validate the super block information, the inode information, the data information, and the like belonging to the file system of the mounted storage section 33 having been cached in the non-volatile memory section 31. Therefore, the virtual manager 45 can use the super block information, the inode information, and the data information stored in the non-volatile memory section 31 to manage the files stored in the mounted storage section 33.

In step S168, the virtual manager 45 allocates the use areas for the mount information list, the mount information, and the super block information to the non-volatile memory section 31, using the non-volatile memory manager 46 (S168). It is noted that, when the use area for the starting point has not been allocated yet, the virtual manager 45 also allocates the starting point.

Therefore, when the super block information or the like belonging to the file system of the mounted storage section 33 has not been cached in the non-volatile memory section 31, the virtual manager 45 can cache the super block information or the like on the mounted storage section 33 additionally on the non-volatile memory section 31. Further, when caching the super block information on the mounted storage section 33 on the non-volatile memory section 31, the virtual manager 45 can match the file system identification information included in the super block information of the storage section 33, and any of the super block information common to the file systems of the non-volatile memory section 31.

The virtual manager 45 advances the process to step S167 after the process of step S168. Then, in step S167, the virtual manager 45 connects the mount information and the hash list, and validates the super block information or the like additionally cached on the non-volatile memory section 31.

Further, in step S169, the virtual manager 45 invalidates all of the super block information, the inode information, the data information, and the like belonging to the file system of the mounted storage section 33, on the non-volatile memory section 31 (S169). Specifically, the virtual manager 45 traces the pointers and the lists starting from the super block information including the file system identification information matching the file system identification information of the mounted storage section 33, and detects the super block information, the inode information, and the data information. The virtual manager 45 deallocates the use areas of these detected information.

After step S169, the virtual manager 45 allocates the use area for the super block information or the like additionally to the non-volatile memory section 31, using the non-volatile memory manager 46 (S170). It is noted that, for the starting point, the mount information list, and the mount information, the virtual manager 45 may reuse the use areas stored previously, or may reallocate the use area previously stored, after deallocation. The virtual manager 45 advances the process to step S167 after the process of step S170. Then, in step S167, the virtual manager 45 connects the mount information and the hash list, and validates the super block information or the like additionally cached on the non-volatile memory section 31.

After the process of step S167, the virtual manager 45 finishes this flow.

As described above, upon mounting the storage section 33, the virtual manager 45 validates the super block information, the data information, and the like having been cached in the non-volatile memory section 31, for management of the files of the mounted storage section 33, on condition that the file system identification information on the storage section 33 matches the file system identification information on the non-volatile memory section 31. Therefore, the virtual manager 45 can appropriately validate the data having been cached for the mounted storage section 33.

It is noted that, when failure such as power off, a software freeze, a hardware error occurs, the virtual manager 45 performs mounting process after rebooting. In this configuration, since the storage section 33 is normally mounted immediately before the failure occurs, the super block information including the file system identification information matching the file system identification information stored in the storage section 33 is left in the non-volatile memory section 31. Accordingly, in this configuration, when the non-volatile cache mode and the recovery mode are set, the virtual manager 45 can recover the cache of the virtual file system to a state immediately before the failure.

Further, upon mounting the storage section 33, the virtual manager 45 may trace the inode information and the data information to check whether there is damaged information. The virtual manager 45 may invalidate the damaged information. Therefore, the virtual manager 45 can cache only undamaged information in the non-volatile memory section 31.

Further, the operating system 36 of the information processing apparatus 10 may have a dedicated delete processing unit for deleting a non-volatile object. The delete processing unit reads the file system identification information from the super block information stored in the non-volatile memory section 31 to make a list, and causes the user to select any of the file systems. The delete processing unit detects the non-volatile object (mount information list, mount information, super block information, inode information, data information, or the like) belonging to the selected file system, tracing the pointers, the lists, and the like, and deallocates the use area of the detected non-volatile object, using the non-volatile memory manager 46. Therefore, the delete processing unit can delete the non-volatile object belonging to the file system for managing the storage section 33 not planned to be mounted.

It is noted that when the information cached in the non-volatile memory section 31 exceeds a certain amount, the virtual manager 45 writes some of the information back to the storage section 33. Therefore, the virtual manager 45 can use the non-volatile memory section 31 without overflow of the information. The virtual manager 45 may determine whether any of the information is write back, using for example a method called least recently used (LRU). The LRU is a method for determining the entry not recently used, using access timing, a flag, and the like, and writing the entry not recently used back to the storage section 33.

Figure 17:
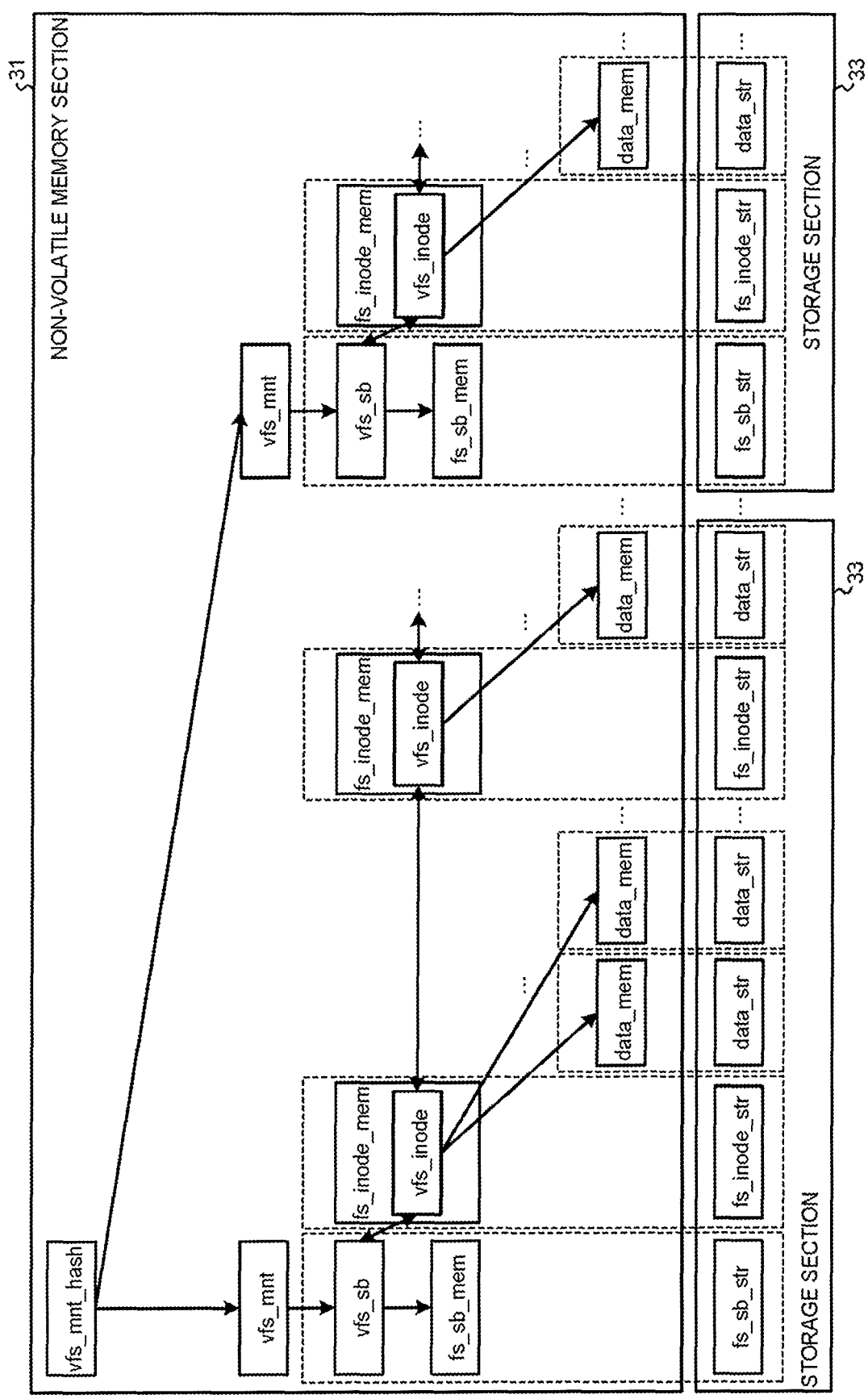
FIG. 17 is a diagram illustrating information of a hash list stored in the non-volatile memory section.

Further, in the present embodiment, the virtual manager 45 causes the volatile memory section 32 to store the hash list vfs_mnt hash, using the volatile memory manager 47. Alternatively, the virtual manager 45 may cause the non-volatile memory section 31 to store the hash list vfs_mnt hash, using the non-volatile memory manager 46. In this configuration, as illustrated in FIG. 17, the virtual manager 45 does not need to set the starting point vfs_mnt_start and the mount information list vfs_mnt_list. However, in this configuration, the virtual manager 45 needs to specify the storage section 33 from the mount information connected to the hash list, and confirm whether the file system identification information match each other, when the hash list vfs_mnt hash is allocated upon booting.

As described above, according to the information processing apparatus 10 of the first embodiment, the management information and the data information of the virtual file system are cached in the non-volatile memory section 31 to be read also after rebooting, so that, even if the failure occurs, the files managed by the plurality of different file systems can be restored to a state immediately before the failure.

Figure 18:
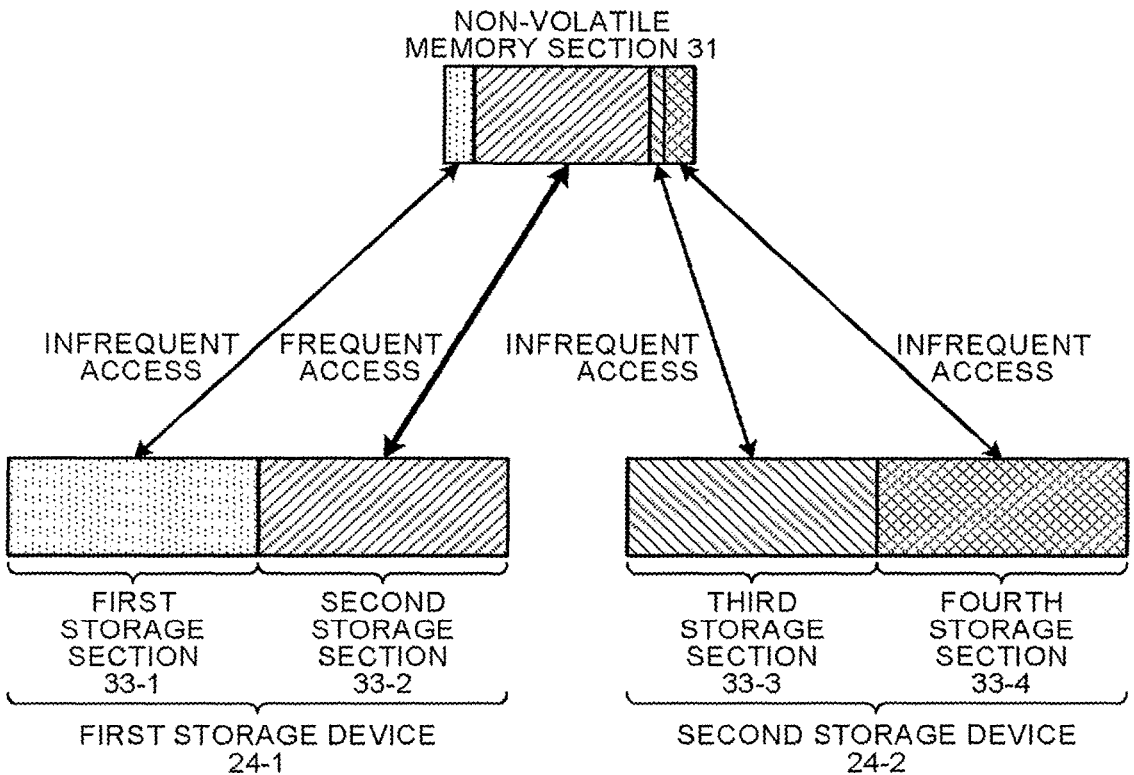
FIG. 18 is a diagram illustrating one example of a share of the non-volatile memory section in each partition.

Further, according to the information processing apparatus 10 according to the first embodiment, an occupied area of the non-volatile memory section 31 can be dynamically changed according to an frequency of access to each storage section 33. For example, as illustrated in FIG. 18, the information processing apparatus 10 has a first storage device 24-1 and a second storage device 24-2.

Further, the first storage device 24-1 is used by being divided into two partitions, and functions as a first storage section 33-1 and a second storage section 33-2. Further, the second storage device 24-2 is used by being divided into two partitions, and functions as a third storage section 33-3 and a fourth storage section 33-4. Further, the second storage section 33-2 stores data of the database, and the first storage section 33-1, the third storage section 33-3, and the fourth storage section 33-4 store configuration files, programs, logs, and the like.

In such a configuration, the virtual manager 45 sequentially deletes, from the non-volatile memory section 31, infrequently accessed data in the management information and the data information of the virtual file system, and causes the non-volatile memory section 31 to preferentially cache frequently accessed data. Accordingly, as illustrated in FIG. 18, when the database is frequently accessed, the virtual manager 45 can cause the non-volatile memory section 31 to cache data stored in the second storage section 33-2 frequently accessed, prior to the data stored in another storage section 33 infrequently accessed.

In the above embodiment, the storage section 33 is configured such that the file system identification information is stored in the super block information, but the file system identification information may be stored in partition information of the storage section 33.

In the above embodiment, an example employing two of the non-volatile object identification information and the file system identification information has been described, but the non-volatile object identification information may be integrated with the file system identification information to employ only the file system identification information.

Second Embodiment

Figure 19:
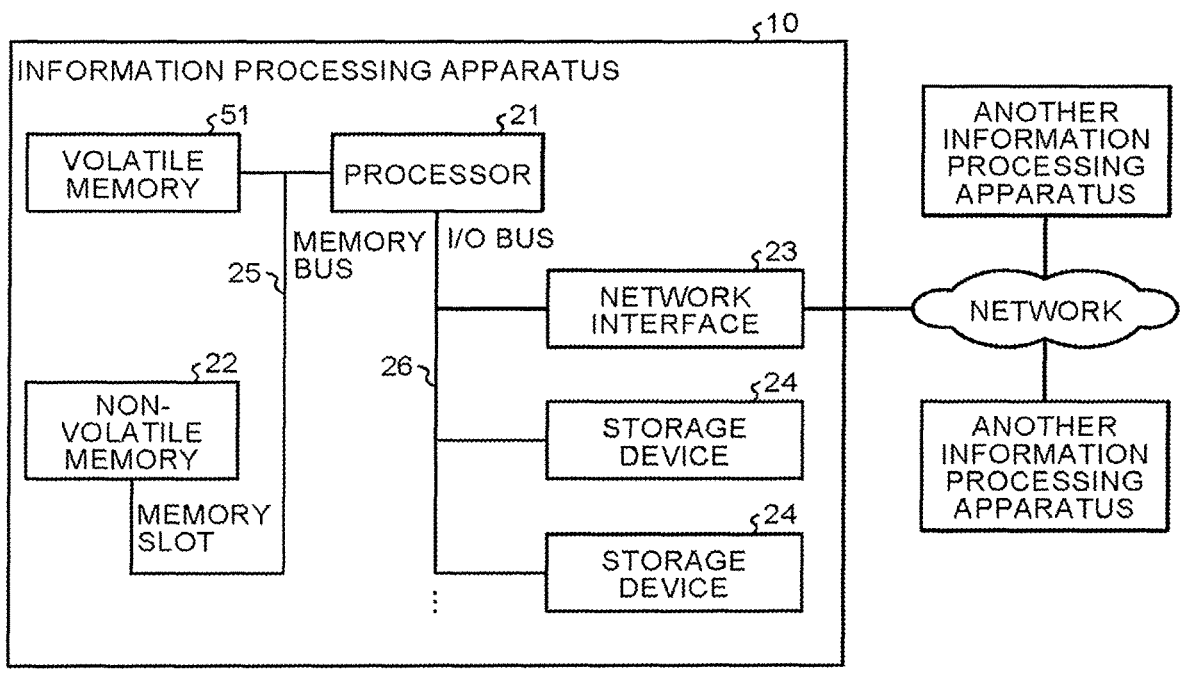
FIG. 19 is a hardware configuration diagram of an information processing apparatus according to a second embodiment.

FIG. 19 is a hardware configuration diagram of the information processing apparatus 10 according to a second embodiment. It is noted that the second embodiment has substantially the same function and configuration as those of the first embodiment, so that members having substantially the same functions and configurations as those of the first embodiment are designated with the same reference signs, and detailed description will be omitted excluding different points.

The information processing apparatus 10 according to the present embodiment further includes a volatile memory 51 in addition to the component elements of the first embodiment. The volatile memory 51 is connected to the processor 21 by the memory bus 25, and erases the information when power is off. The volatile memory 51 is for example DRAM.

Figure 20:
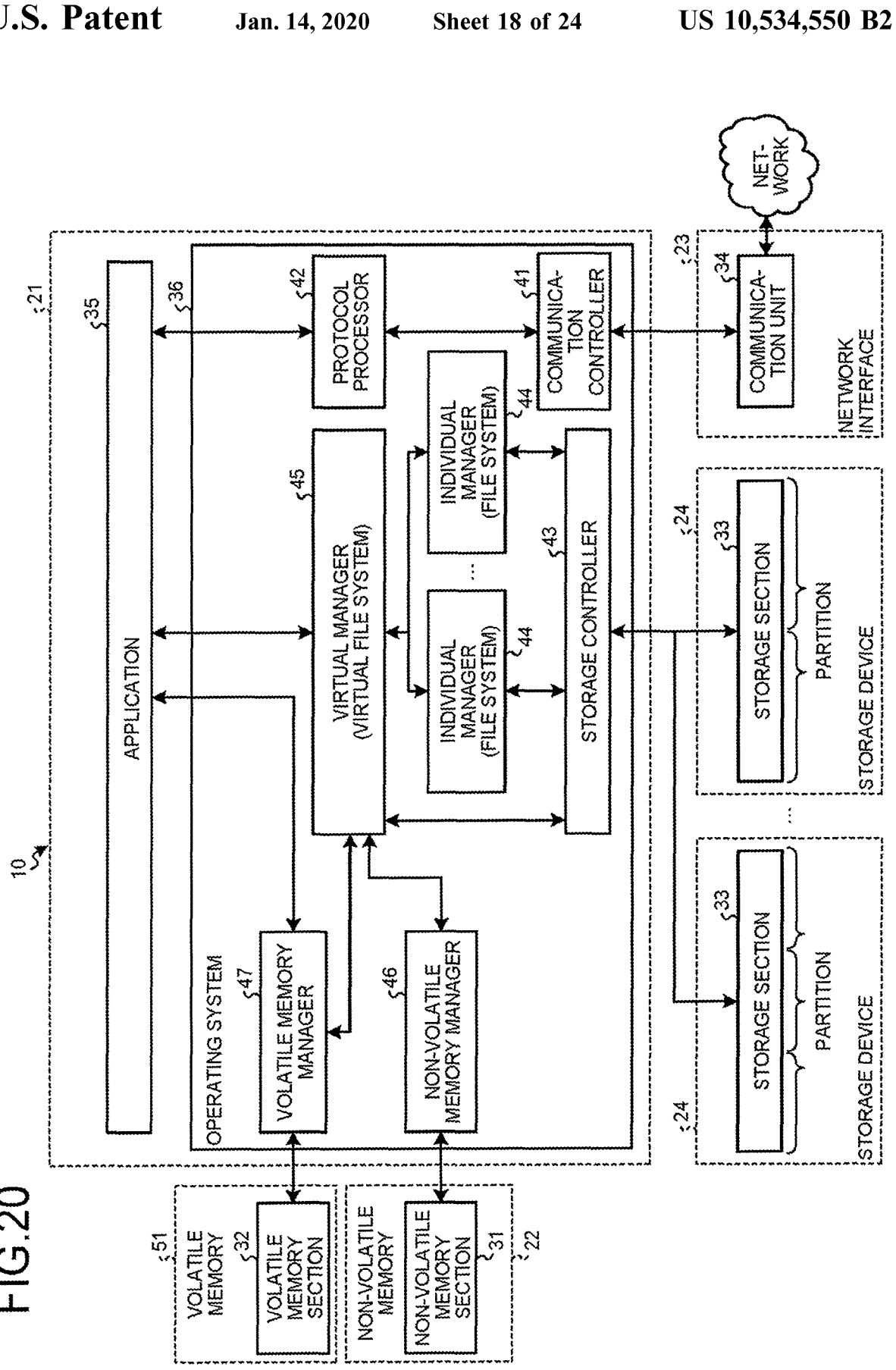
FIG. 20 is a functional block diagram of the information processing apparatus according to the second embodiment.

FIG. 20 is a diagram illustrating a functional block configuration of the information processing apparatus 10 according to the second embodiment. In the present embodiment, the volatile memory section 32 is included in the volatile memory 51.

Figure 21:
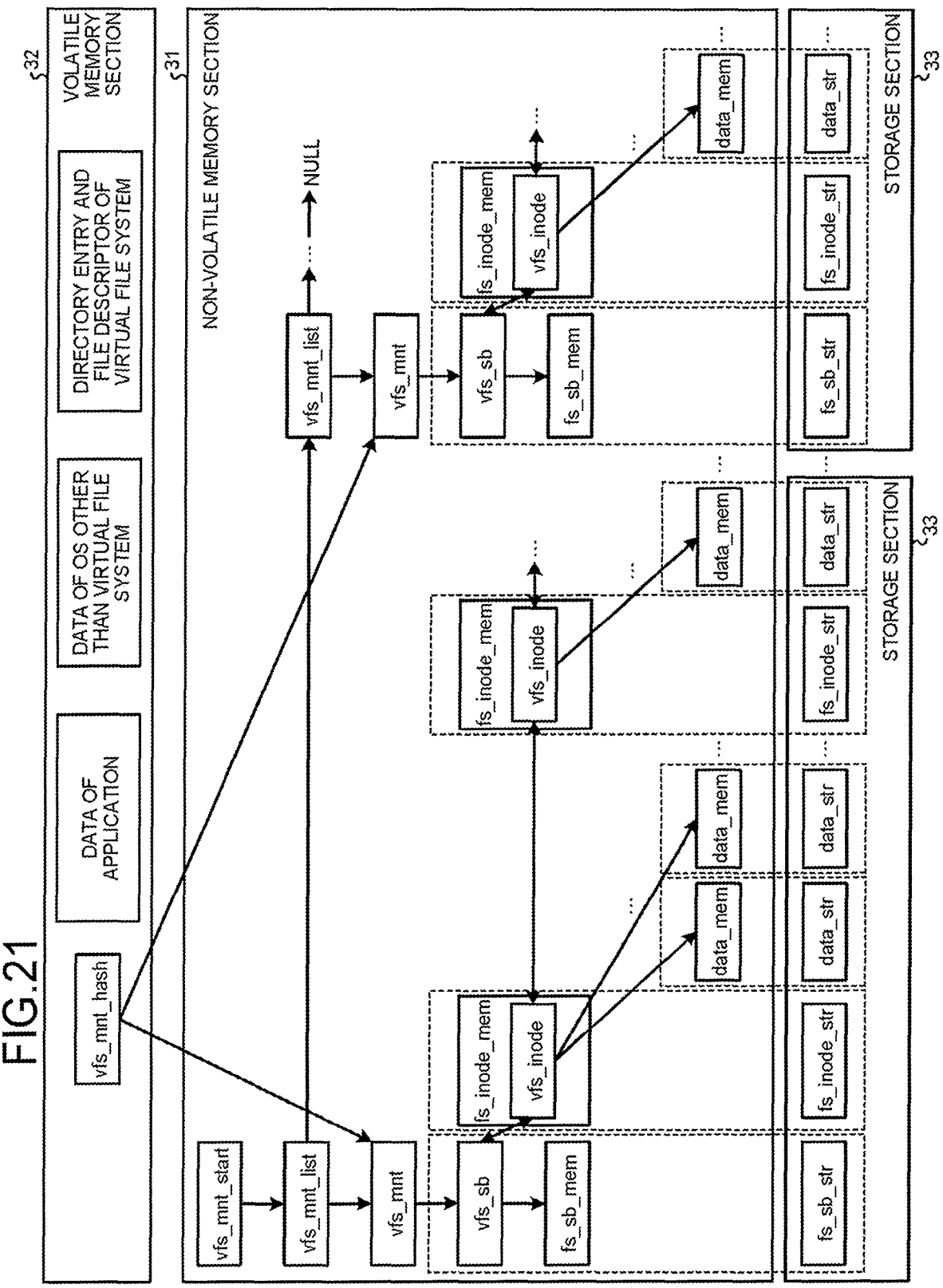
FIG. 21 is a diagram illustrating information stored in the non-volatile memory section and the like according to the second embodiment.

FIG. 21 is a diagram illustrating a relationship between the information stored in the non-volatile memory section 31, the volatile memory section 32, and the storage section 33 in the second embodiment.

In the second embodiment, the volatile memory section 32 stores data of the application 35, and data of the operating system (OS) other than the virtual file system. Further, the virtual manager 45 may cause the volatile memory section 32 to store information of the management information of the virtual file system, using the volatile memory manager 47. The information is not required to be non-volatile, including information for speeding up searching for a file. For example, the virtual manager 45 may cause the volatile memory section 32 to store information or the like about a directory entry and the file descriptor, using the volatile memory manager 47.

Generally, the volatile memory 51 has a low cost per bit and a fast response speed compared with the non-volatile memory 22. Accordingly, the information processing apparatus 10 according to the second embodiment can achieve an effect similar to that of the first embodiment, while maintaining low cost and increased processing speed.

According to the second embodiment, for example, in the storage section 33 to which data is infrequently written, the non-volatile cache mode is optionally set upon mounting the storage section 33, and cached in the volatile memory, so that the non-volatile memory 22 having a high cost can be efficiently used for another necessary area.

Third Embodiment

Figure 22:
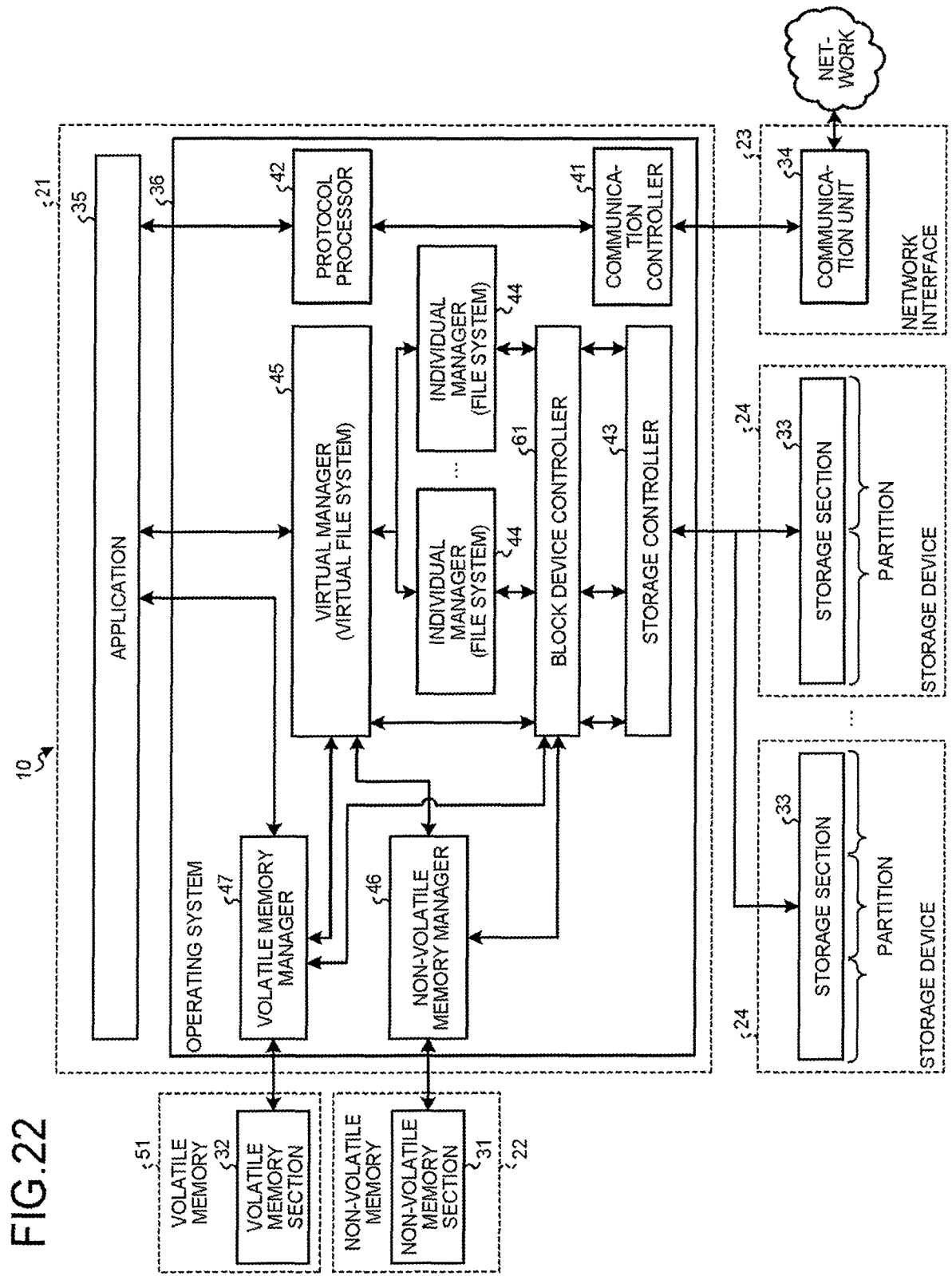
FIG. 22 is a functional block diagram of an information processing apparatus according to a third embodiment.

FIG. 22 is a diagram illustrating a functional block configuration of the information processing apparatus 10 according to a third embodiment. It is noted that the third embodiment has substantially the same function and configuration as those of the second embodiment, so that members having substantially the same functions and configurations as those of the second embodiment are designated with the same reference signs, and detailed description will be omitted excluding different points.

The information processing apparatus 10 according to the present embodiment further includes a block device controller 61 in addition to a functional configuration of the second embodiment.

The block device controller 61 builds a new logical address for the storage section 33, and constitutes one virtual block device having a log structure. The block device controller 61 manages data stored in the block device, in blocks. The block device controller 61 receives, from the individual manager 44, the virtual manager 45, or the like, a request for writing or reading data in blocks to and from the block device. The block device controller 61 accesses the block device according to the received request. The block device controller 61 is achieved by incorporating, into the operating system 36, a device driver being a software program for controlling such a block device.

The SSD, the HDD, or the like generally provides high performance rather in sequential access writing than in random access writing. For example, the SSD, the HDD, or the like can quickly process rather writing 512 KB data, or 128-page data, than writing 4 KB data of a general page size. The block device controller 61 achieves a function for collectively writing data to the storage section 33, and speeds up access to the storage section 33. Further, in the SSD, the sequential access writing reduces frequency of writing to NAND flash memory, and extends the life of the SSD.

Further, the block device controller 61 is operated subordinately to the file system, so that the block device controller 61 can quickly write data managed by various file systems to the storage section 33. Further, in order to update the data, the block device controller 61 does not overwrite the data of the storage section 33, but writes data to a new additional area of the storage section 33. Therefore, the block device controller 61 can usually write data sequentially.

Figure 23:
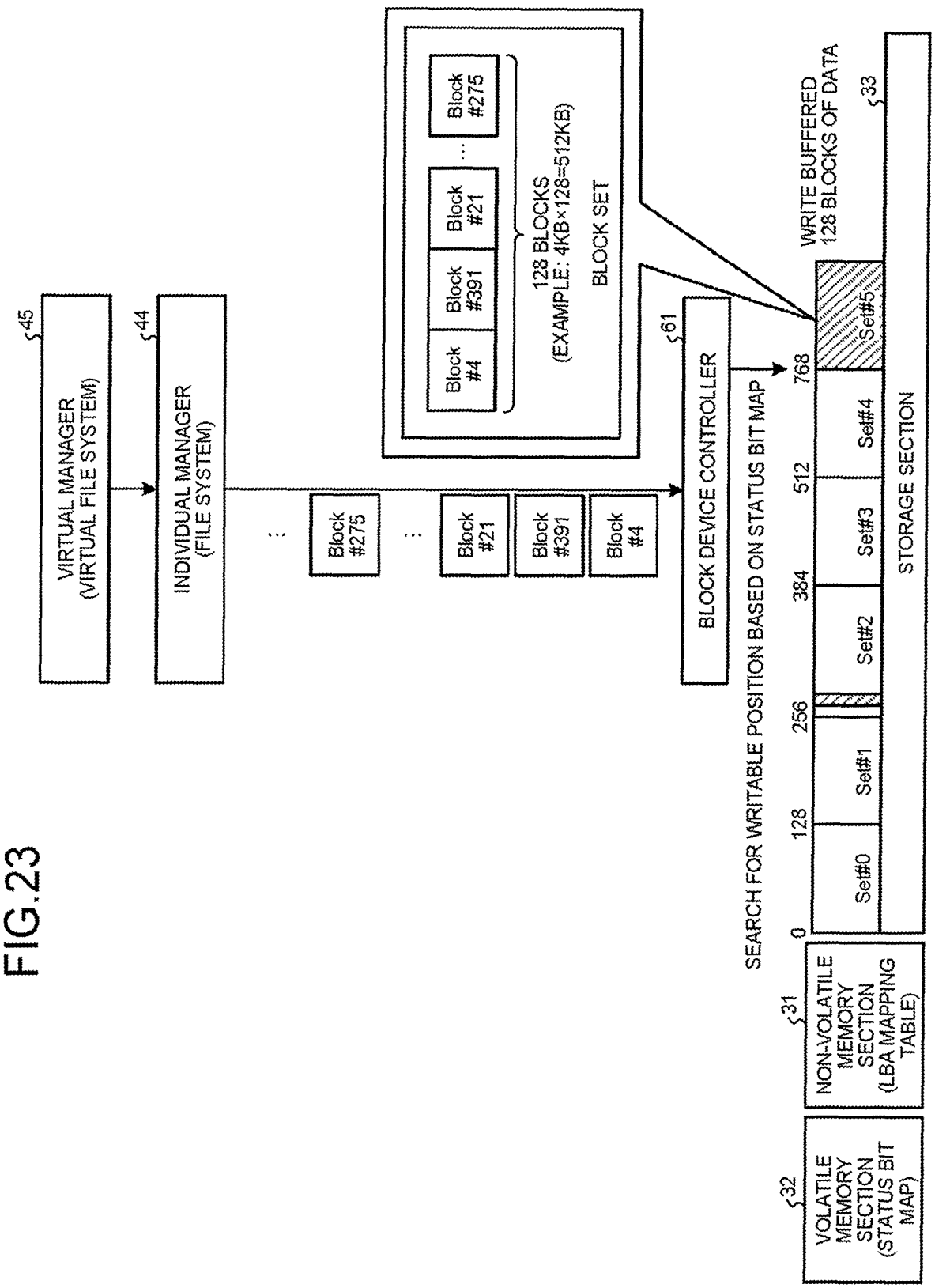
FIG. 23 is a diagram illustrating a write process of the information processing apparatus according to the third embodiment.

FIG. 23 is a diagram illustrating a write process of the information processing apparatus 10 according to the third embodiment. FIG. 24 is an exemplary diagram illustrating a status bit map. FIG. 25 is an exemplary diagram illustrating an logical block Address (LBA) mapping table.

The individual manager 44 transmits a request for writing data to the block device controller 61, in blocks as managers of data in the file system. The block represents a data size of for example 1 KB, 2 KB, or 4 KB, set by the user upon formatting the file system. In the present embodiment, the block is for example 4 KB.

After receiving a predetermined number of write requests, the block device controller 61 starts the write process. For example, after receiving 128 requests for writing 4 KB data block, the block device controller 61 starts the write process. A certain number of collected blocks are referred as a block set. In the present embodiment, collected 128 blocks are referred to as the block set. The block device controller 61 writes, to the storage section 33, data in block sets.

The block device controller 61 controls writing and reading to the storage section 33, using the status bit map and the LBA mapping table (address mapping table). The status bit map is stored in the volatile memory section 32. The LBA mapping table is stored in the non-volatile memory section 31.

As illustrated in FIG. 24, the status bit map is a map indicating whether each of the blocks of each block set is used or unused. The storage section 33 is managed by being divided into areas of block set size as a whole, and each of the divided areas is designated by a unique block set number. The status bit map identifies the position of the block set based on the block set number. Further, the status bit map has the entry corresponding to each block set number. Each entry has the number of bits equal to the number of blocks included in one block set. Each of the bits corresponds to a position of a block in the block set. For example, when each of the bits has a value of 1, the bit represents that a corresponding block is used, and when a bit has a value of 0, the bit represents that a corresponding block is unused.

When the block device is generated at first, the block device controller 61 initializes all of the bits of all entries in the status bit map to 0 representing an unused state. When writing the block set, the block device controller 61 searches for an entry in which all of the bits have a value of 0 representing an unused state, and writes the block set to a position of the block set number corresponding to the entry having all bits indicating 0. When the block set is written, the block device controller 61 rewrites all of the bits included in the entry of the corresponding block set number to a value 1 representing a used state.

As illustrated in FIG. 25, the LBA mapping table associates a logical block address used for the block device, with a logical block address of the storage section 33, for each block. Use of the LBA mapping table allows the block device controller 61 to manage a position of the storage section 33 at which a block at a specific logical block address in the block device is stored. It is noted that the block device controller 61 may set a block unit used for the LBA mapping table, independently of the file system. In the present embodiment, the block unit used for the LBA mapping table is for example 4 KB which is the same as the block unit of the file system.

When data is read from a specified logical block address in the block device, the block device controller 61 identifies a logical block address of the storage section 33 corresponding to the specified logical block address of the block device with reference to the LBA mapping table. Then, the block device controller 61 reads the data from the identified position in the storage section 33.

When data is written to the specified logical block address in the block device, the block device controller 61 references the status bit map to identify a new area on the storage section 33 to which no data is written, and writes the data to the new area. Then, the block device controller 61 rewrites the contents of the logical block address of the storage section 33 corresponding to the specified logical block address of the block device to a logical block address of the new area to which the data is actually written, in the LBA mapping table.

As described above, when rewriting the data of the storage section 33, the block device controller 61 writes data to a new area without overwriting the data of the storage section 33. Therefore, the block device controller 61 can sequentially write data.

Further, the block device controller 61 performs garbage collection at predetermined timing. In the garbage collection, the block device controller 61 scans the status bit map, and reuses a block set having fewer used blocks. Specifically, the block device controller 61 searches the block set in ascending order of used blocks, for example, in the order of the entries having one used block, the entries having two used blocks, and the like, and detects the used blocks in the searched block set. When the number of the detected used blocks reaches the number of blocks of one block set (e.g., 128 blocks), the block device controller 61 puts the detected blocks into one block set.

Performance of such garbage collection allows the block device controller 61 to form, in the storage section 33, an area (block set having all unused blocks) to which new data can be written. When, for example, the number of unused block sets is not more than a certain percentage of all the block sets (e.g., ¼ or less), the block device controller 61 may perform such garbage collection. Further, when a block set having fewer used blocks is generated, as a result of update of the status bit map, the block device controller 61 may combine the block set with adjacent another block set.

Next, a specific processing example of the block device controller 61 upon receiving a write request will be described.

For example, as illustrated in FIG. 23, the virtual manager 45 instructs the individual manager 44 to write the management information, the data information, and the like of the virtual file system to the storage section 33. Additionally, for example, the individual manager 44 receiving the instruction makes write requests to the block device controller 61, using numbers counted from the head of the block device, for example, Block #4, Block #391, Block #21, . . . , Block #275, and the like.

In this case, the block device controller 61 holds the write requests until receiving 128 blocks of write requests. When receiving the 128 blocks of write requests, the block device controller 61 collects the write requests into one block set, and writes the one block set of write requests to the storage section 33. In this configuration, the block device controller 61 references the status bit map to determine a writing position. The block device controller 61 searches for the entry having all bits indicating 0, started with a block set number 0 in the status bit map. In an example of FIG. 24, a block set number 5 has all bits indicating 0. Accordingly, the block device controller 61 determines to write the block set to the position of the block set number 5. The block device controller 61 rewrites all of the bits of the block set number 5 in the status bit map to 1 indicating a used state, and writes the block set to the position of the block set number 5 in the storage section 33. It is noted that the block has a size of 4 KB, therefore, the position of the block set number 5 is the 768th block from the head.

When writing to the storage section 33 is finished, the block device controller 61 updates the LBA mapping table. The head block of the written information block has a logical block address of 4 in the block device. The block device controller 61 rewrites the logical block address of the storage section 33 of the entry at a logical block address 4 of the block device in the LBA mapping table from 257 previously written to 768 being a position to which information is written this time.

The block device controller 61 updates the 257th block of the storage section 33 no longer referenced, in the status bit map. The 257th block corresponds to the 0th bit of a block set number 2. Accordingly, the block device controller 61 updates the 0th bit of the block set number 2 from 1 to 0. The block device controller 61 also performs the same processing on the 391st block, the 21st block, . . . , and the 275th block.

Whereas, when the block device controller 61 receives a read request, the processing is performed specifically as follows.

For example, the individual manager 44 makes a read request to the block device controller 61 for a logical address 4096 (logical block address 1) of the block device. In this case, the block device controller 61 converts the logical block address 1 of the block device to a logical block address 998 of the storage section 33, with reference to the LBA mapping table. A logical block address corresponding to the logical block address 998 of the storage section 33 is expressed as follows: 998×4,096=4,087,808. Accordingly, the block device controller 61 makes a read request to the storage controller 43, specifying a logical address 4087808.

Figure 26:
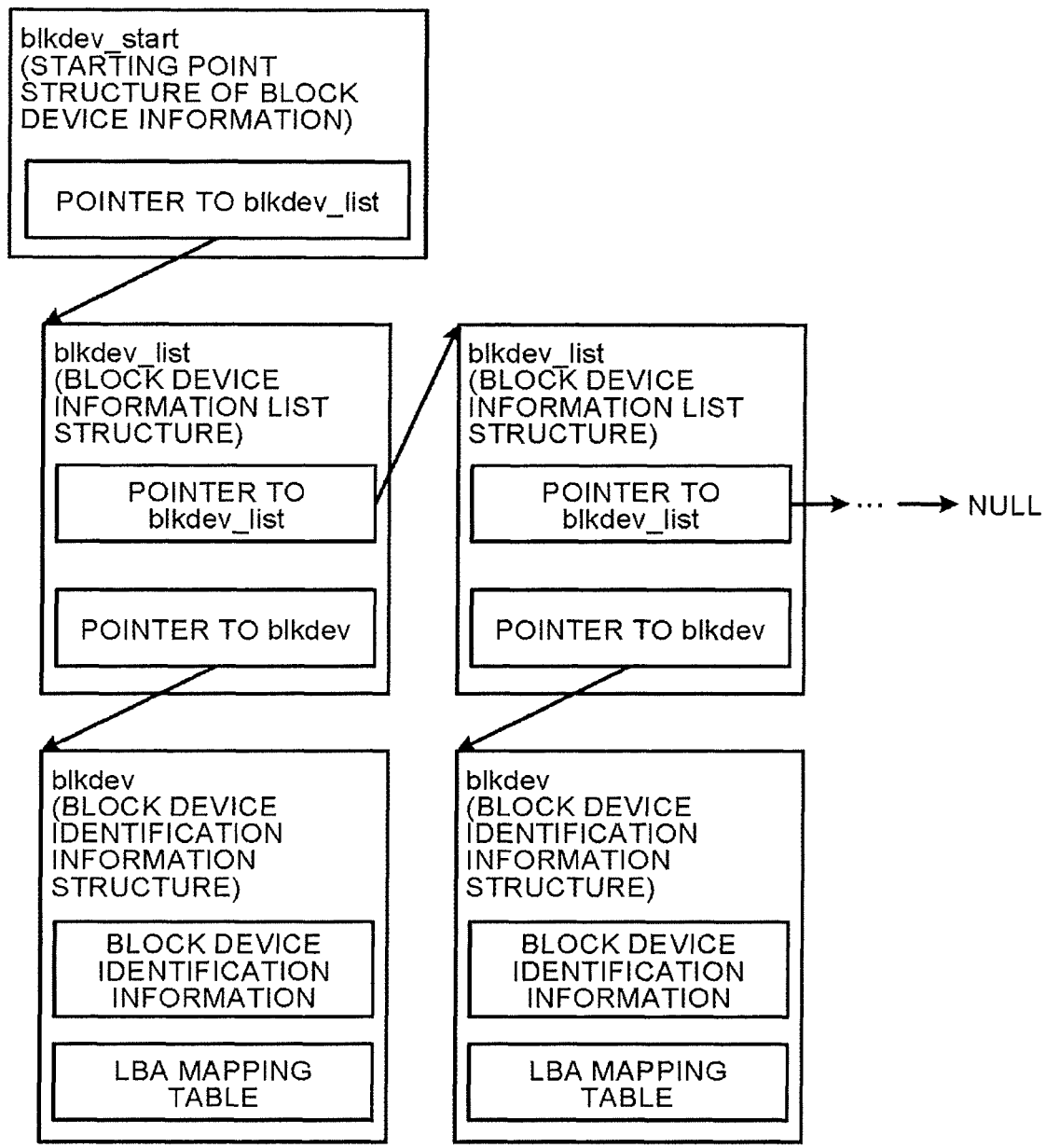
FIG. 26 is a diagram illustrating block device information.

FIG. 26 is a diagram illustrating a relationship between block device information about the block devices stored in the non-volatile memory section 31 according to the third embodiment. The non-volatile memory manager 46 causes the non-volatile memory section 31 to store the block device information so that the block device information can be restored even after rebooting. Specifically, the non-volatile memory manager 46 causes the non-volatile memory section 31 to store each of information included in the block device information so that the each of information can be traced from the starting point.

The block device information includes blkdev_start, blkdev_list, and blkdev. The blkdev_start is a starting point structure of the block device information. The blkdev_list is a block device information list structure. The blkdev is a block device identification information structure. The block device information includes the blkdev for each created block device. Further, the block device information includes the blkdev_list corresponding to each blkdev.

The blkdev_start includes a pointer to the first blkdev_list. The blkdev_list includes a pointer to the blkdev_list as a next entry, and a pointer to a corresponding blkdev. The blkdev includes block device identification information and the LBA mapping table.

The block device information is information used for determination of correspondence between the LBA mapping table of the non-volatile memory section 31 and the storage section 33. The block device identification information is, for example, the UUID generated upon creating the block device. The UUID is stored at the blkdev and the head of the storage section 33. On condition that the UUID at the head of the storage section 33 matches the UUID at the blkdev, the block device controller 61 validates the block device information stored in the non-volatile memory section 31. Therefore, the block device controller 61 can prevent management of the block device based on different block device information.

Figure 27:
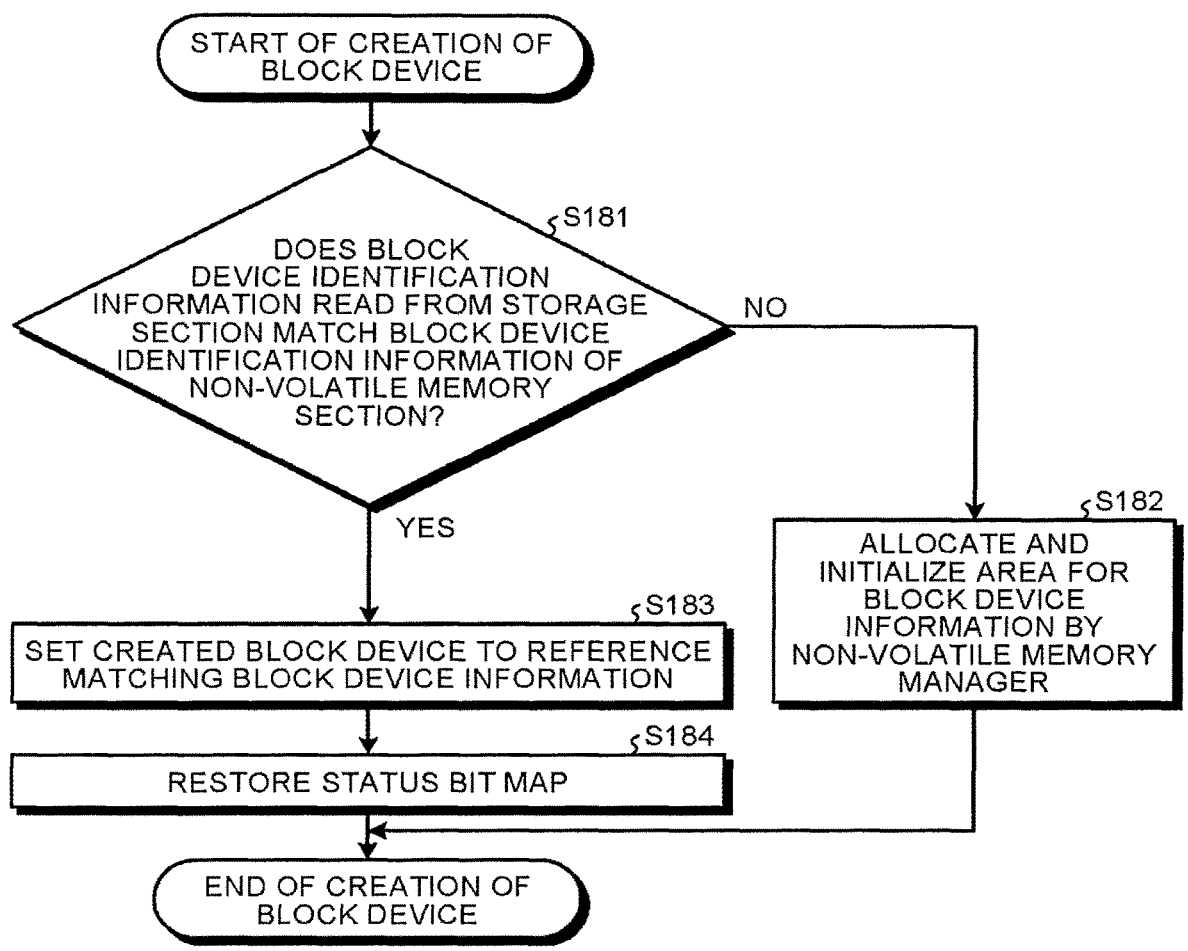
FIG. 27 is a flowchart illustrating a process of creating a block device.

FIG. 27 is a flowchart illustrating a process upon creating a block device. When receiving a block device creation instruction from the user or the like, the block device controller 61 performs a process illustrated in FIG. 27.

First, the block device controller 61 obtains the block device identification information (e.g., UUID) from a specified storage section 33. Further, the block device controller 61 accesses the non-volatile memory section 31 through the non-volatile memory manager 46, traces the blkdev_list from the blkdev_start, obtains the UUID stored in the block device identification information of the blkdev, and compares the obtained UUID with the block device identification information on the storage section 33 (step S181).

When the UUID does not match the block device identification information (step S181, No), the block device controller 61 allocates areas for the blkdev_start, the blkdev_list, and the blkdev to the non-volatile memory section 31, through the non-volatile memory manager 46. The block device controller 61 initializes the LBA mapping table of the blkdev, for example, so that the logical block address of the block device and the logical block address of the storage section 33 have the same value (S182). Further, the block device controller 61 generates the block device identification information to be stored at the blkdev and the head of the storage section 33, and connects the blkdev_start, the blkdev_list, and the blkdev with pointers.

When the UUID matches the block device identification information match each other (step S181, Yes), the block device controller 61 sets the created block device to reference the blkdev having the matching block device identification information (S183). Therefore, the block device controller 61 can achieve the block device, using the LBA mapping table of the blkdev having the matching block device identification information.

After S183, the block device controller 61 restores the status bit map (S184). The block device controller 61 wholly initializes the status bit map to 0 at first, scans the LBA mapping table stored in the non-volatile memory section 31 from the head, and checks whether a block corresponding to the logical block address of the storage section 33 is used. When the block corresponding to the logical block address of the storage section 33 is used, the block device controller

61 sets a corresponding bit to 1. By performing such a process, the block device controller 61 can restore the state of the status bit map.

When the process of S182 or S184 is finished, the block device controller 61 finishes this flow.

It is noted that, in the present embodiment, the status bit map is stored in the volatile memory section 32. However, the status bit map may be stored in the non-volatile memory section 31 so as to be restored even after rebooting. Therefore, when the block device is created again, the block device controller 61 can restore the status bit map without scanning the LBA mapping table.

Further, the block device controller 61 may build a new logical address by combining, for example, a plurality of storage devices 24 or a plurality of partitions to constitute one virtual block device. Further, the information processing apparatus 10 may have a plurality of block device controllers 61 to operate a plurality of block devices in parallel. For example, one of the block devices may perform log-structured writing, and the other may be obtained by virtually combining a plurality of storage devices 24. Further, in this configuration, when the plurality of block devices are operated in parallel, the storage controller 43 accesses the storage device 24 upon receiving a request from each block device controller 61.

Further, in the present embodiment, an example has been described in which the LBA mapping table is stored in the non-volatile memory section 31 upon creating the block device, and even after the block device is deallocated, the non-volatile memory section 31 is caused to store the LBA mapping table. Alternatively, when the block device is deallocated, the block device controller 61 may write the LBA mapping table back to the storage section 33. Therefore, when the block device is not created, other information can be stored in the area of the non-volatile memory section 31 in which the block device information has been stored. In the present embodiment, the block device controller 61 accesses the non-volatile memory section 31 through the non-volatile memory manager 46, but the block device controller 61 may access to the non-volatile memory section 31 from the storage controller 43 through the non-volatile memory manager 46.

As described above, according to the information processing apparatus 10 of the third embodiment, the LBA mapping table can be stored in the non-volatile memory section 31, and the block device having a log structure for high-speed writing can be achieved. Therefore, according to the information processing apparatus 10 of the third embodiment, even if the non-volatile memory section 31 has a free space reduced due to caching the management information, the data information, and the like of the virtual file system, data can be quickly written back to the storage section 33 to increase the free space of the non-volatile memory section 31.

It is noted that the information processing apparatus 10 having such a structure as described above can also be achieved, for example, using the general-purpose computer apparatus as a basic hardware. That is, the storage controller 43, the individual manager 44, the virtual manager 45, the non-volatile memory manager 46, and the volatile memory manager 47 can be achieved by causing the processor 21 mounted to the computer apparatus to execute a program. At this time, the information processing apparatus 10 may be achieved by preliminarily installing the program on the computer apparatus, or may be achieved by appropriately installing, on the computer apparatus, the program stored in a storage medium, which may be provided as a computer program product, such as a CD-ROM or distributed through a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a controller connectable to a non-volatile memory and configured to:
manage, by using a common virtual file system, a plurality of files that are stored in a storage section and that are managed by different file systems;
save, in the non-volatile memory, management information and data information of the virtual file system to be read after the apparatus starts operation,
write identification information for identifying the virtual file system or the information processing apparatus at a position that is traceable from a predetermined address of the non-volatile memory, and
when the identification information stored in the non-volatile memory matches the identification information held by the information processing apparatus, read the management information and the data information of the virtual file system stored in the non-volatile memory.

2. The information processing apparatus according to claim 1, wherein
the controller is connectable to a volatile memory, and
the controller saves, in the volatile memory, data other than the management information and the data information of the virtual file system.

3. The information processing apparatus according to claim 1, wherein
the controller saves, in the non-volatile memory, the management information and the data information of the virtual file system to be read after the apparatus starts the operation without accessing the storage section.

4. The information processing apparatus according to claim 1, wherein
the controller saves, in the non-volatile memory, the management information and the data information of the virtual file system to be traceable from data stored at a predetermined address.

5. The information processing apparatus according to claim 1, wherein
the controller writes file system identification information for identifying the virtual file system at the position as the identification information, and
when the identification information stored in the non-volatile memory latches the file system identification information stored in the storage section, the controller reads the management information and the data information of the virtual file system stored in the non-volatile memory.

6. The information processing apparatus according to claim 1, wherein
the controller writes unique identification information of the information processing apparatus at the position as the identification information, and
when the identification information stored in the non-volatile memory matches the unique identification information held by the information processing apparatus, the controller reads the management information and the data information of the virtual file system stored in the non-volatile memory.

7. An information processing method for an information processing apparatus including a controller connectable to a non-volatile memory, the method comprising:
managing, by using a common virtual file system, a plurality of files that are stored in a storage section and that are managed by different file systems;
saving, in the non-volatile memory, management information and data information of the virtual file system to be read after the apparatus starts operation;
writing identification information for identifying the virtual file system or the information processing apparatus at a position that is traceable from a predetermined address of the non-volatile memory; and
when the identification information stored in the non-volatile memory matches the identification information held by the information processing apparatus, reading the management information and the data information of the virtual file system stored in the non-volatile memory.

8. A computer program product comprising a non-transitory computer-readable medium storing a program thereon and executed by a computer including a controller connectable to a non-volatile memory, wherein the program causes the computer to execute:
managing, by using a common virtual file system, a plurality of files that are stored in a storage section and that are managed by different file systems;
saving, in the non-volatile memory, management information and data information of the virtual file system to be read after the computer starts operation;
writing identification information for identifying the virtual file system or the information processing apparatus at a position that is traceable from a predetermined address of the non-volatile memory; and
when the identification information stored in the non-volatile memory matches the identification information held by the information processing apparatus, reading the management information and the data information of the virtual file system stored in the non-volatile memory.

* * * * *